(12) United States Patent
Ori

(10) Patent No.: US 7,215,487 B2  
(45) Date of Patent: May 8, 2007

(54) ZOOM LENS INCLUDING A FUNCTION OF PREVENTING BLURRING OF AN IMAGE

(75) Inventor: Tetsuya Ori, Koshigaya (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/365,852

(22) Filed: Mar. 2, 2006

(65) Prior Publication Data

US 2006/0215275 A1    Sep. 28, 2006

(30) Foreign Application Priority Data

Mar. 24, 2005    (JP)    ............................. 2005-086926

(51) Int. Cl.
G02B 15/14     (2006.01)
G02B 13/04     (2006.01)

(52) U.S. Cl. ........................ 359/689; 359/73

(58) Field of Classification Search ................ 359/683, 359/684, 689, 753; 396/55
See application file for complete search history.

(56) References Cited

U.S. PATENT DOCUMENTS 5,069,537 A    12/1991    Kitagishi
5,652,678 A    7/1997    Suzuki et al.
6,943,960 B2    9/2005    Ori et al.
7,023,623 B2 *    4/2006    Miyatake et al. ........... 359/676

* cited by examiner

Primary Examiner—Ricky Mack
Assistant Examiner—William Choi
(74) Attorney, Agent, or Firm—Arnold International; Jon W. Henry; Bruce Y. Arnold

(57) ABSTRACT

A zoom lens includes a function of preventing blurring of an image due to movements, such as shaking of the zoom lens, by moving the second lens group, in order from the object side, orthogonally to the optical axis in order to correct for blurring of an image due to movements of the zoom lens. The zoom lens includes a first lens group having negative refractive power, a second lens group having positive refractive power, and a third lens group having positive refractive power. The first and second lens groups move along the optical axis during zooming, as does the third lens group in all but one embodiment of the invention. The zoom lens satisfies certain conditions related to the configuration of the lens elements and lens groups of the zoom lens in order to prevent blurring and to provide a compact zoom lens having excellent correction of aberrations.

20 Claims, 12 Drawing Sheets

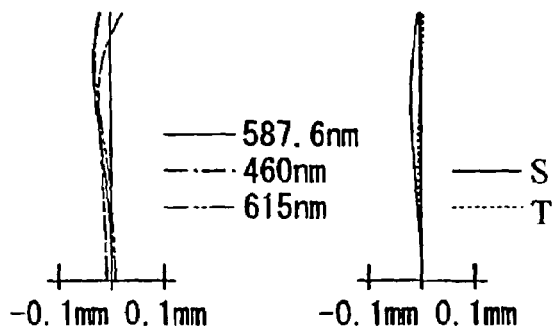
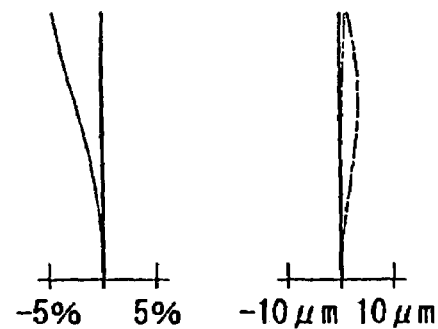
Spherical Aberration
Fig. 5A
Astigmatism
Fig. 5B
Distortion
Fig. 5C
Lateral Color
Fig. 5D
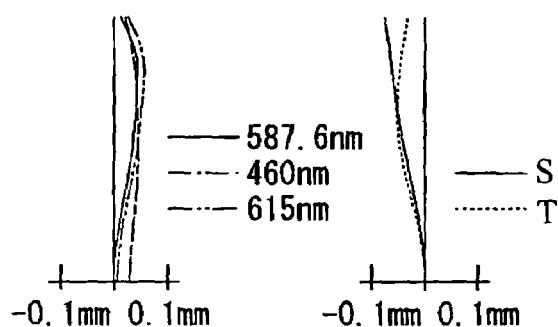
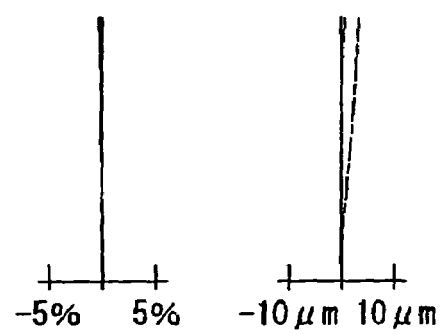
Spherical Aberration
Fig. 6A
Astigmatism
Fig. 6B
Distortion
Fig. 6C
Lateral Color
Fig. 6D

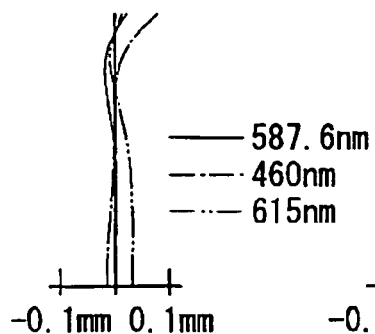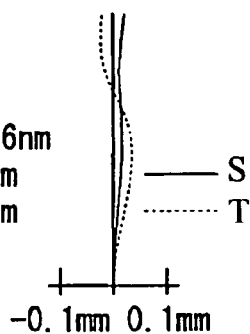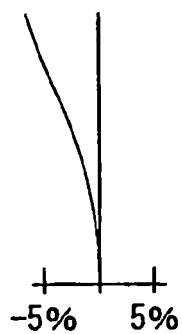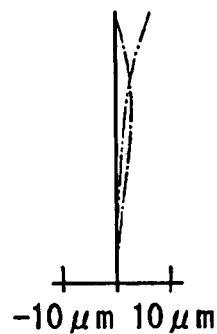
| FNO.=2.93 | ω=34.5° | ω=34.5° | ω=34.5° |
|---|---|---|---|
| Spherical Aberration Fig. 8A | Astigmatism Fig. 8B | Distortion Fig. 8C | Lateral Color Fig. 8D |
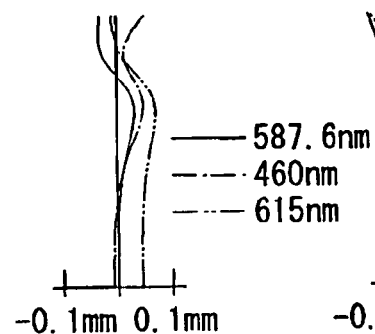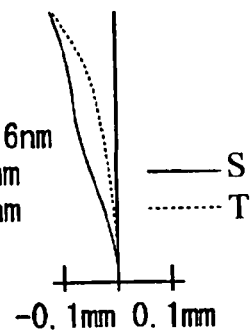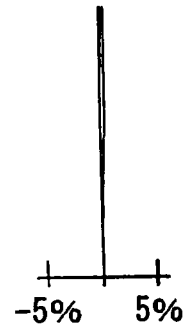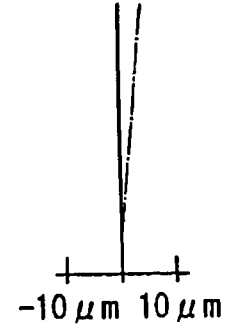
| FNO.=5.98 | ω=9.9° | ω=9.9° | ω=9.9° |
|---|---|---|---|
| Spherical Aberration Fig. 9A | Astigmatism Fig. 9B | Distortion Fig. 9C | Lateral Color Fig. 9D |

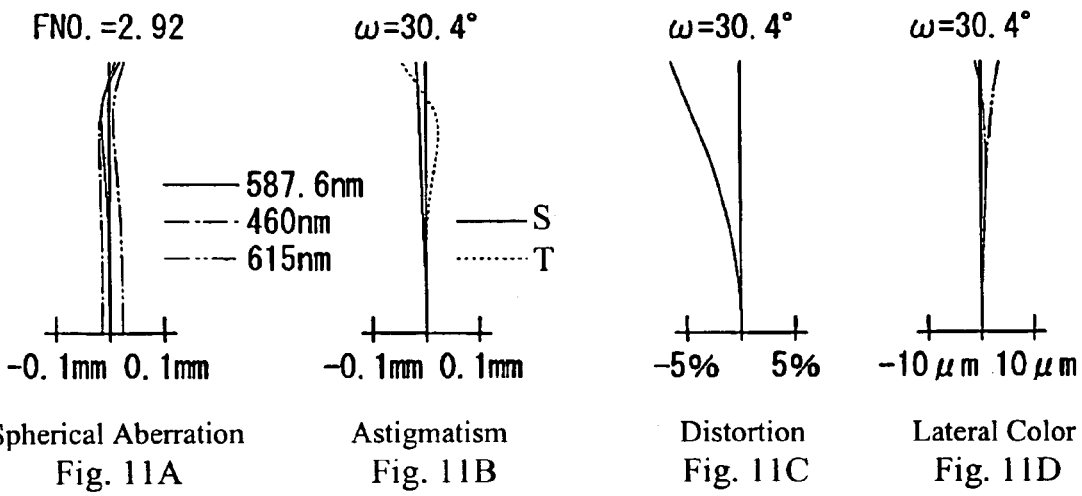
Spherical Aberration
Fig. 11A
Astigmatism
Fig. 11B
Distortion
Fig. 11C
Lateral Color
Fig. 11D
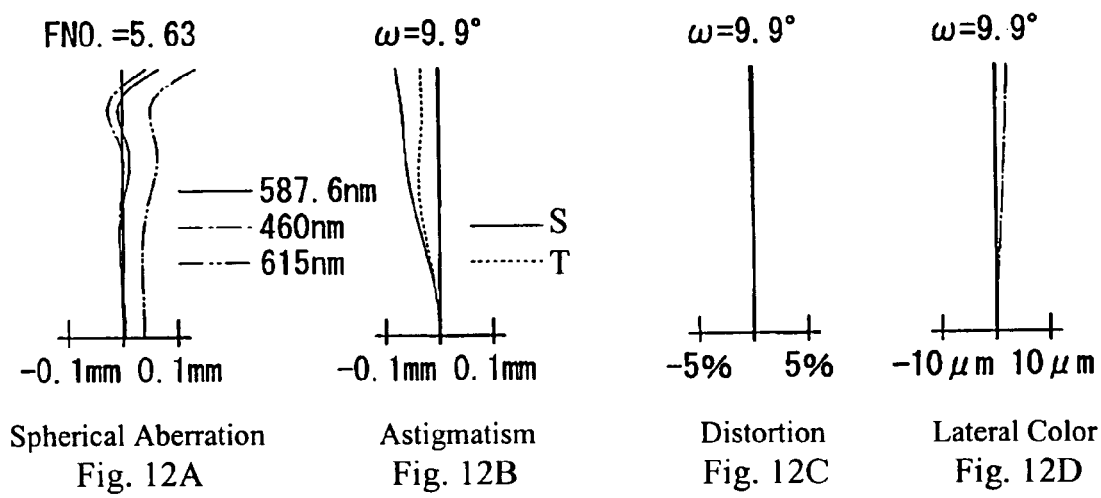
Spherical Aberration
Fig. 12A
Astigmatism
Fig. 12B
Distortion
Fig. 12C
Lateral Color
Fig. 12D

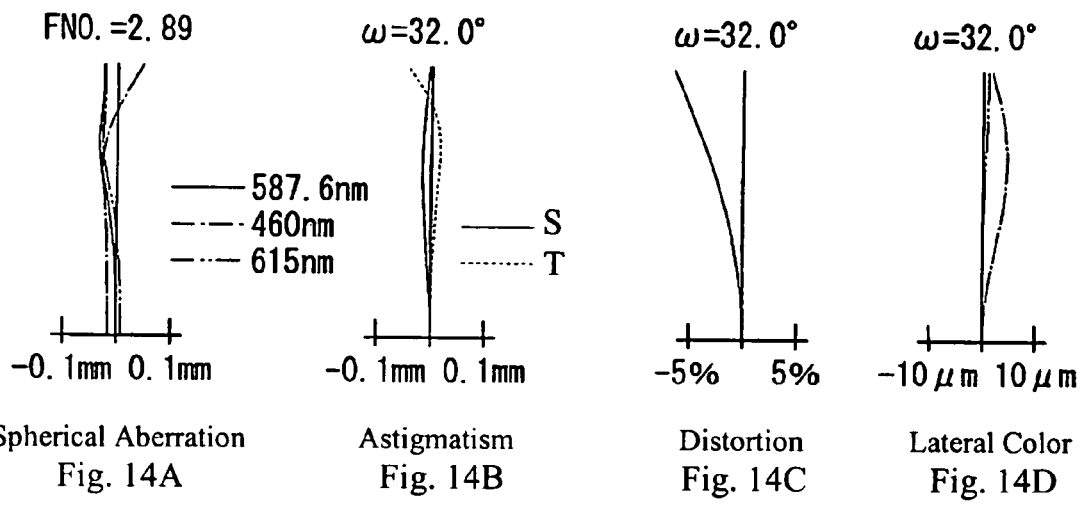
Spherical Aberration
Fig. 14A
Astigmatism
Fig. 14B
Distortion
Fig. 14C
Lateral Color
Fig. 14D
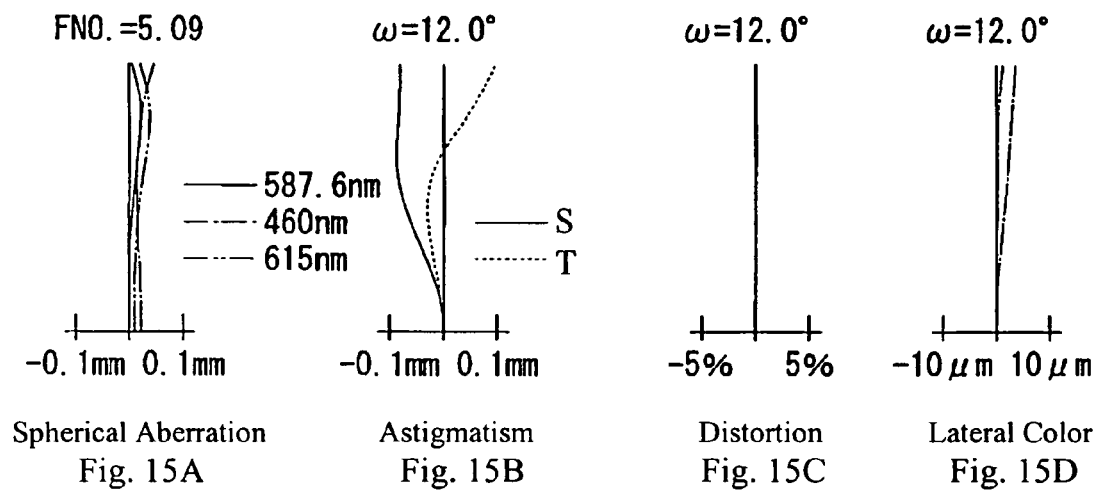
Spherical Aberration
Fig. 15A
Astigmatism
Fig. 15B
Distortion
Fig. 15C
Lateral Color
Fig. 15D

ZOOM LENS INCLUDING A FUNCTION OF PREVENTING BLURRING OF AN IMAGE

TECHNICAL FIELD OF THE INVENTION

The present invention relates to a zoom lens including a function of preventing blurring of an image for mounting in compact digital still cameras (commonly called digital cameras) and video cameras for consumers.

BACKGROUND OF THE INVENTION

During photography using a digital camera or a video camera for consumers, recorded images are sometimes blurred due to movements of the zoom lens during image capture caused by the hands of the operator of the camera shaking or by other factors. In a known prior art technique for preventing such blurring of images, specified lenses of the imaging optical system are moved orthogonally to the optical axis in order to provide a function of preventing blurring of an image.

For example, a zoom lens including a function of preventing blurring of an image is disclosed in Japanese Laid-Open Patent Application No. H06-337374. The zoom lens of Japanese Laid-Open Patent Application No. H06-337374 is a two-group zoom lens including, in order from the object side, a first lens group having negative refractive power and a second lens group having positive refractive power. In this zoom lens, the second lens group is moved orthogonally to the optical axis in order to prevent blurring of images due to movements of the zoom lens during image capture.

Japanese Laid-Open Application No. H01-167724 discloses an imaging optical system including multiple lens groups wherein a specified lens group is moved orthogonally to the optical axis in order to prevent blurring of images due to movements of the zoom lens during image capture. In Japanese Laid-Open Application No. H01-167724, the image magnification of this specified lens group is limited to be no larger than a certain value in order to limit the movement off the optical axis in a direction orthogonal to the optical axis required for the specified lens group to prevent blurring of the image being captured.

Additionally, the applicant of the present application disclosed a three-group zoom lens having high resolution in Japanese Laid-Open Patent Application No. 2004-240222. However, this zoom lens does not include a function of preventing blurring of an image.

Recently, there has been increased demand for zoom lenses that are compact overall and include a function of preventing blurring of an image accurately. However, the two-group zoom lens disclosed in Japanese Laid-Open Patent Application No. H06-337374, discussed above, wherein light emerging from the second lens group is nearly collimated before it reaches the image pickup surface, such as a CCD (charge coupled device), tends to have a large overall length, making it difficult to reduce the size of the zoom lens. On the other hand, quick response is required to accomplish highly accurate correction when image blurring movements, such as movements caused by hands shaking, occur. In order to obtain this quick response, it is desirable that the movement off the optical axis of the lenses being used to prevent blurring of a captured image be as small as possible. The imaging optical system of Japanese Laid-Open Application No. H01-167724, discussed above, has successfully reduced the movement off the optical axis required of the lenses being used to prevent blurring of a captured image. However, it does not provide sufficiently accurate correction for movements that cause blurring of a captured image as is desired for future use. Therefore, a zoom lens that more efficiently prevents blurring of a captured image while achieving more compactness is desired.

BRIEF SUMMARY OF THE INVENTION

The present invention relates to a zoom lens that includes a function of preventing blurring of an image due to movements of the zoom lens, such as hand shaking movements, that exhibits excellent optical performance and that has a compact construction.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 5A–5D show the spherical aberration, astigmatism, distortion, and lateral color, respectively, of the zoom lens of Embodiment 1 of the present invention at the wide-angle end;

FIGS. 6A–6D show the spherical aberration, astigmatism, distortion, and lateral color, respectively, of the zoom lens of Embodiment 1 of the present invention at the telephoto end;

FIGS. 8A–8D show the spherical aberration, astigmatism, distortion, and lateral color, respectively, of the zoom lens of Embodiment 2 of the present invention at the wide-angle end;

FIGS. 9A–9D show the spherical aberration, astigmatism, distortion, and lateral color, respectively, of the zoom lens of Embodiment 2 of the present invention at the telephoto end;

FIGS. 11A–11D show the spherical aberration, astigmatism, distortion, and lateral color, respectively, of the zoom lens of Embodiment 3 of the present invention at the wide-angle end;

FIGS. 12A–12D show the spherical aberration, astigmatism, distortion, and lateral color, respectively, of the zoom lens of Embodiment 3 of the present invention at the telephoto end;

FIGS. 14A–14D show the spherical aberration, astigmatism, distortion, and lateral color, respectively, of the zoom lens of Embodiment 4 of the present invention at the wide-angle end;

FIGS. 15A–15D show the spherical aberration, astigmatism, distortion, and lateral color, respectively, of the zoom lens of Embodiment 4 of the present invention at the telephoto end.

DETAILED DESCRIPTION

Figure 1:
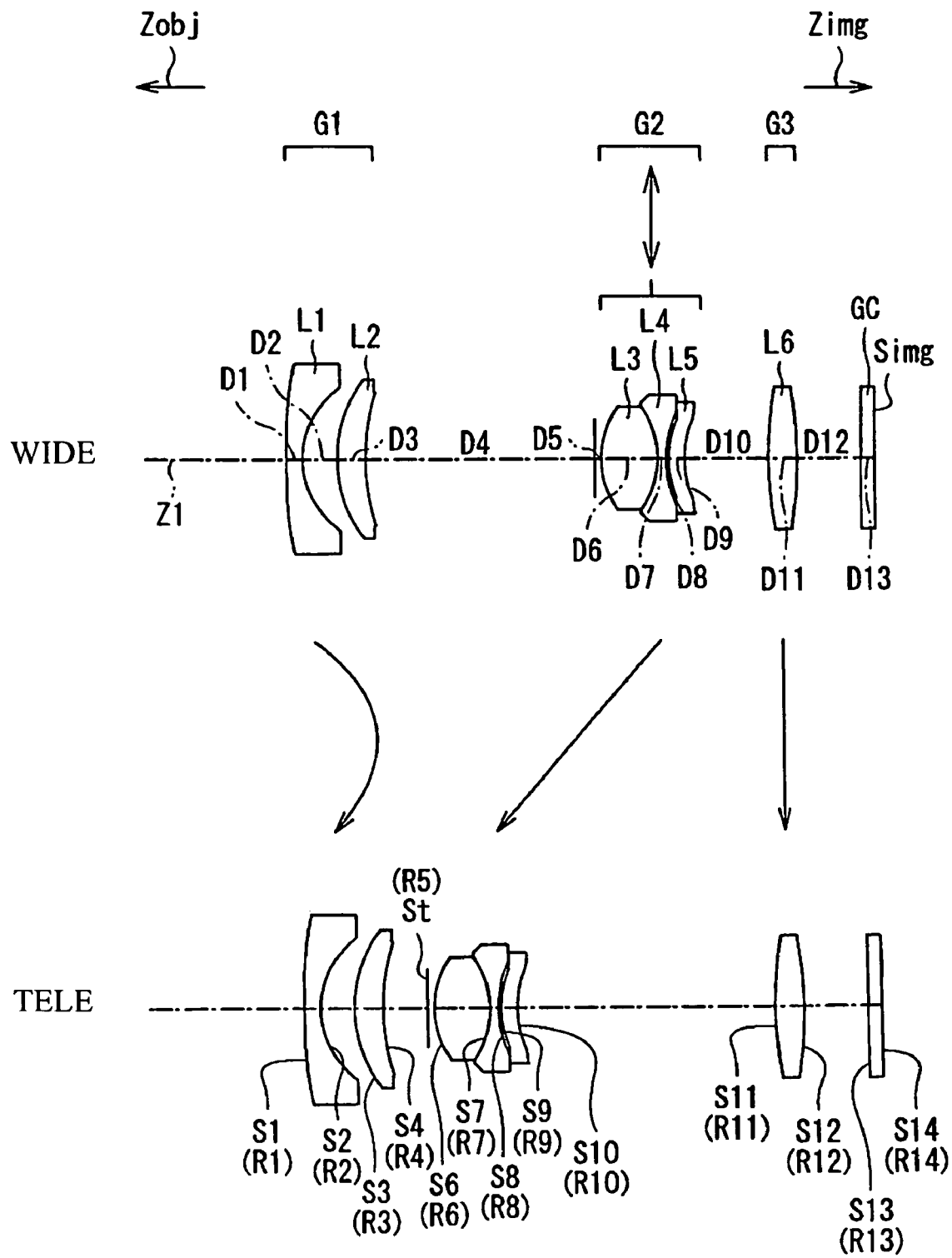
FIG. 1 shows cross-sectional views of the zoom lens of Embodiment 1 of the present invention at the wide-angle end (WIDE) and at the telephoto end (TELE)

A general description of a zoom lens including a function of preventing blurring of an image will first be described with reference to FIG. 1 that shows cross-sectional views of the zoom lens of Embodiment 1 of the present invention at the wide-angle end (WIDE) with the zoom lens focused at infinity, at the top of FIG. 1, and at the telephoto end (TELE) with the zoom lens focused at infinity, at the bottom of FIG. 1. In FIG. 1, a horizontal arrow at the upper left labeled "Zobj" points in the direction indicating the object side of the zoom lens, and a horizontal arrow at the upper right labeled "Zimg" points in the direction indicating the image side of the zoom lens. At the top of FIG. 1, lens elements are referenced by the letter L followed by a number denoting their order from the object side of the zoom lens along the optical axis Z1, from L1 to L6. Similarly, at the bottom of FIG. 1, the surfaces of the various optical elements, including the lens surfaces, are referenced by the letter S followed by a number denoting their order from the object side of the zoom lens along the optical axis, from S1 to S14, and the corresponding radii of curvature of the surfaces of the various optical elements, including the lens surfaces, are referenced in parentheses under the S number of the surfaces by the letter R followed by a number denoting their order from the object side of the zoom lens, from R1 to R14. Note that although R is the on-axis radius of curvature, for convenience of illustration, in FIG. 1 the lead lines from the R reference symbols extend to the surfaces being referenced but do not extend to the on-axis positions. Also, at the top of FIG. 1, the on-axis surface spacings along the optical axis Z1 of the various optical surfaces are referenced by the letter D followed by a number denoting their order from the object side of the zoom lens, from D1 to D13. In the same manner, at the top of FIG. 1, three lens groups are labeled G1, G2, and G3 in order from the object side of the zoom lens and the lens elements belonging to each lens group are indicated by the brackets adjacent the labels G1, G2, and G3.

Additionally, in the middle of FIG. 1, downwardly directed arrows below the three lens groups G1, G2, and G3 indicate the movement of these lens groups along the optical axis Z1 during zooming, with movement during zooming from the wide-angle end to the telephoto end of the zoom range being indicated by the component of these arrows in the direction of the optical axis Z1. These arrows illustrate that during zooming from the wide-angle end to the telephoto end, the distance along the optical axis between the first lens group G1 and the second lens group G2 decreases, the second lens group moves along the optical axis continuously toward the object side, and the third lens group remains stationary on the optical axis. Also, in FIG. 1, a double headed vertical arrow indicates the movement of the second lens group G2 in a direction orthogonal to the optical axis Z1 in order to correct for blurring of an image to be formed at an image plane Simg on the image side of the zoom lens due to movements, due for example to hand shaking, of the zoom lens. Additionally, FIG. 1 shows a parallel plane plate cover glass GC adjacent the image plane Simg and a diaphragm or stop, labeled St at the bottom of FIG. 1, on the object side of the sixth optical surface S6.

Figure 2:
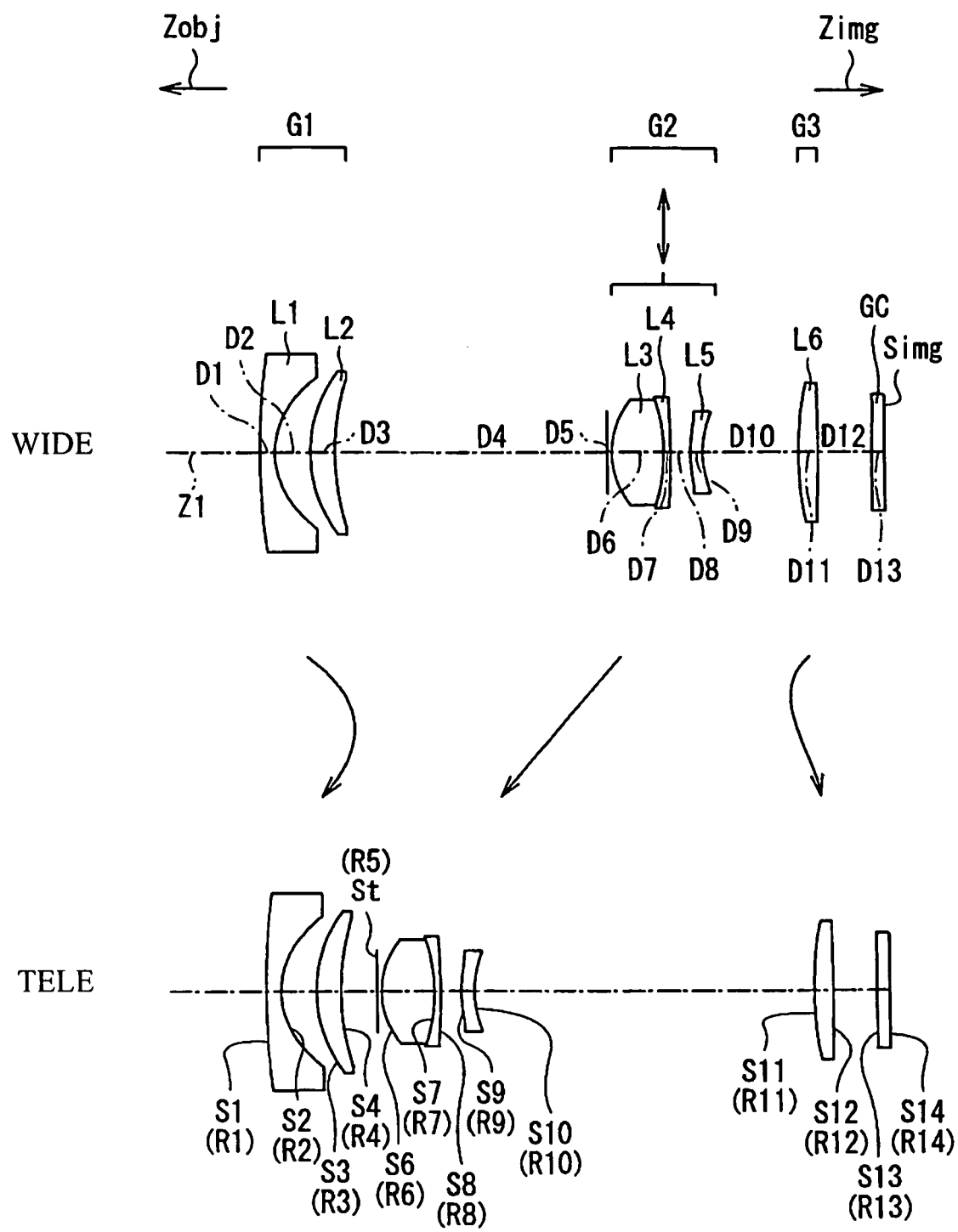
FIG. 2 shows cross-sectional views of the zoom lens of Embodiment 2 of the present invention at the wide-angle end (WIDE) and at the telephoto end (TELE)
Figure 3:
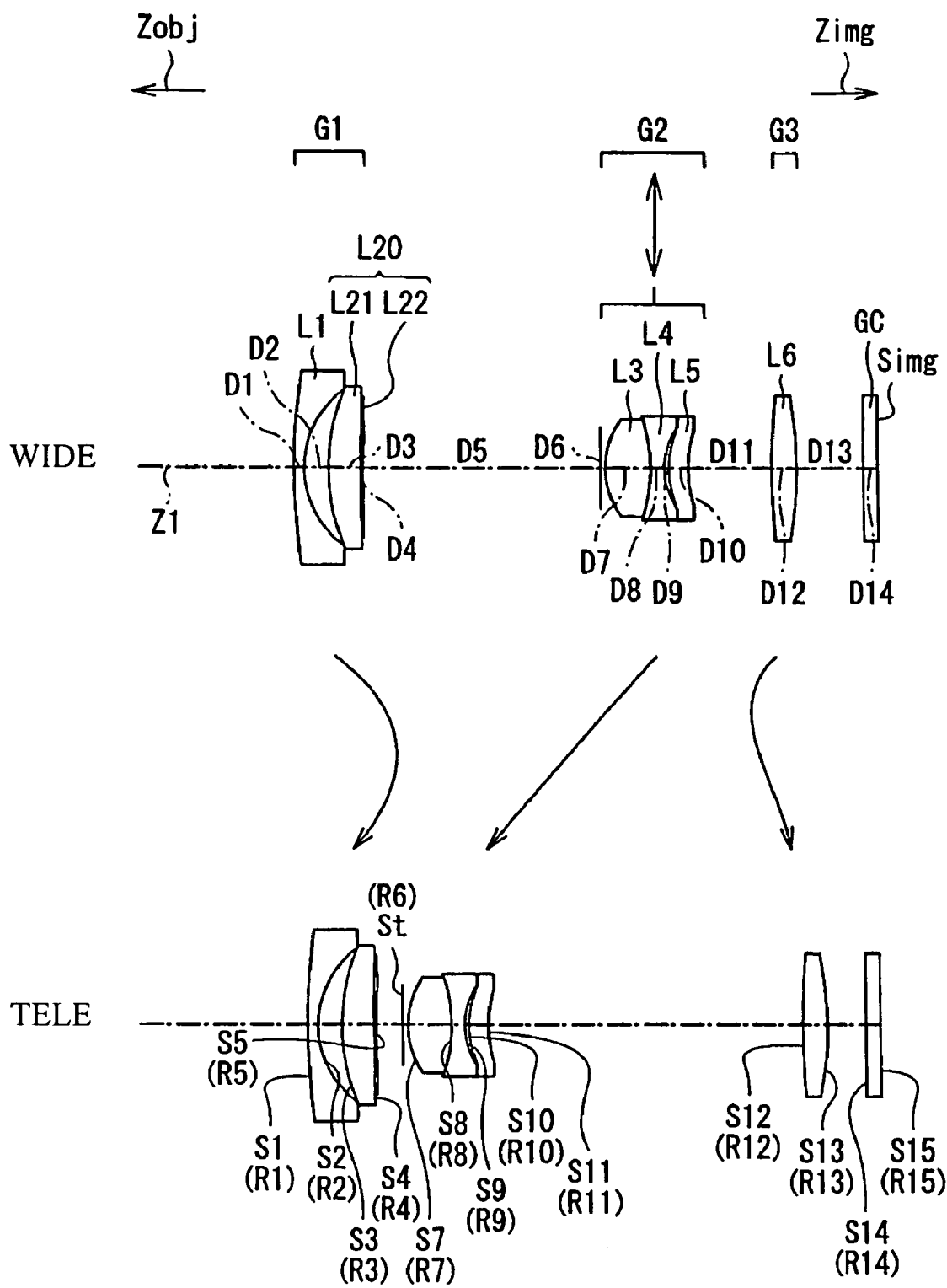
FIG. 3 shows cross-sectional views of the zoom lens of Embodiment 3 of the present invention at the wide-angle end (WIDE) and at the telephoto end (TELE)
Figure 4:
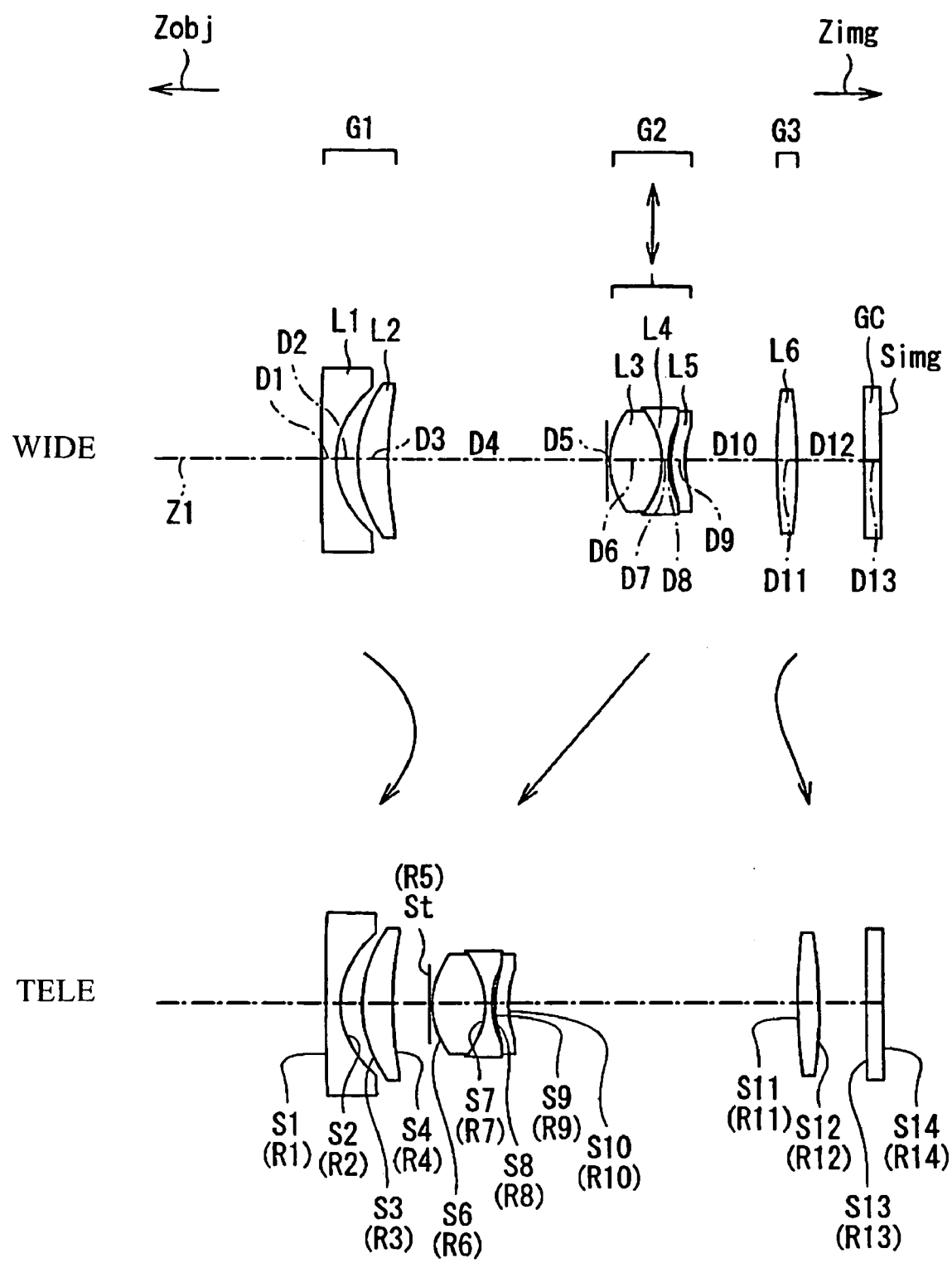
FIG. 4 shows cross-sectional views of the zoom lens of Embodiment 4 of the present invention at the wide-angle end (WIDE) and at the telephoto end (TELE)

FIGS. 2, 3, and 4 similarly show cross-sectional views of the zoom lenses of Embodiments 2, 3, and 4, respectively, of the present invention at the wide-angle end (WIDE) and at the telephoto end (TELE) with the zoom lenses focused at infinity. The general configurations of the zoom lenses of Embodiments 1–4 are similar and therefore these embodiments are generally described with reference to FIG. 1 that shows Embodiment 1. However, features of Embodiments 2–4 that differ from Embodiment 1 will be pointed out with reference to the separate figures corresponding to these embodiments in the separate descriptions of the various embodiments below.

The terms "lens group", "lens element", and "lens component" will now be defined, with the term "lens group" being defined in terms of "lens elements" and "lens components" as explained herein. The term "lens element" is herein defined as a single transparent mass of refractive material having two opposed refracting surfaces, which surfaces are positioned at least generally transversely of the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." Alternatively, two or more lens elements may be joined together, as by cementing the lens elements together, in order to form a lens component. A lens component made up of only two lens elements cemented together is a doublet.

The term "lens group" is herein defined as an assembly of one or more lens components in optical series and with no intervening lens components along an optical axis that, during zooming, is movable as a single unit relative to another lens component or other lens components.

The zoom lens of the present invention may be mounted, for example, in compact cameras, such as digital still cameras and video cameras for consumers. As shown in FIG. 1, this zoom lens includes, arranged along the optical axis Z1 in order from the object side, a first lens group G1 having negative refractive power, a second lens group G2 having positive refractive power, a third lens group G3 having positive refractive power, and a parallel plane plate cover glass GC. The image pickup surface of an image pickup device such as a CCD (charge-coupled device) is provided on the imaging surface Simg. FIG. 1 shows the diaphragm St in an exemplary position on the object side of the second lens group G2. As shown in FIG. 1, the distances along the optical axis between the first and second lens groups G1 and G2 and between the second and third lens groups G2 and G3 change during zooming from the wide-angle to the telephoto end. As shown by the downwardly directed arrows in FIG. 1, in Embodiment 1 of the present invention, during zooming from the wide-angle end to the telephoto end while the zoom lens is focused at infinity, the distance along the optical axis Z1 between the first lens group G1 and the second lens group G2 decreases, the second lens group moves along the optical axis Z1 continuously toward the object side, but the third lens group does not move along the optical axis Z1. On the other hand, in Embodiments 2, 3, and 4 of the present invention that are shown in FIGS. 2, 3, and 4, respectively, during zooming from the wide-angle end to the telephoto end while the zoom lens is focused at infinity, the distance along the optical axis Z1 between the first lens group G1 and the second lens group G2 decreases and the second lens group moves along the optical axis Z1 continuously toward the object side, but the third lens group G3 moves along the optical axis first away from the image side and then toward the image side and the third lens group is closer to the image side at the telephoto end than at the wide-angle end. In FIGS. 1, 2, 3, and 4, the movement of lens group G3 and/or G1 toward and away from the object side of the zoom lens during zooming is indicated by the downwardly directed arrows indicating the movement being curved. However, the actual movement being indicated by these arrows is only straight line movement along the optical axis Z1, unlike the movement indicated by the double-headed vertical arrow above lens group G2 in FIGS. 1, 2, 3, and 4. The curved lines indicate that, as the second lens group moves along said optical axis continuously toward the object side at a constant speed, the first lens group (and the third lens group when it is movable along the optical axis during zooming) moves (move) more quickly along the optical axis as zooming approaches the wide-angle end and as zooming approaches the telephoto end than in the middle of the zoom range.

The first lens group G1 has a two lens element configuration formed of, in order from the object side, a first lens element L1 and a second lens element L2. The first lens element L1 is, in the example of FIG. 1, a lens element of negative refractive power and a meniscus shape with its convex surface on the object side. The second lens element L2 is, in the example of FIG. 1, a lens element having positive refractive power and a meniscus shape with its convex surface on the object side. However, in Embodiment 3 of the present invention, shown in FIG. 3, the first lens group G1 has a three lens element configuration that includes a doublet L20 in place of the second lens element L2. The doublet L20 is formed of a lens element L21 and a lens element L22 that are cemented together. The lens element L21 is, in the example of FIG. 3, a lens element having positive refractive power and a meniscus shape with its convex surface on the object side. The lens element L22 is, in the example of FIG. 3, a lens element having negative refractive power and a meniscus shape with its convex surface on the object side.

In Embodiment 1, the first lens element L1 has aspheric lens surfaces S1 and S2. The lens surfaces that are aspheric may be defined using the following Equation (A):

$$Z = [(C \cdot Y^2)/\{1+(1-K \cdot C^2 \cdot Y^2)^{1/2}\}] + \Sigma(A_i \cdot Y^i) \quad \text{Equation (A)}$$

where
- Z is the length (in mm) of a line drawn from a point on the aspheric lens surface at a distance Y from the optical axis to the tangential plane of the aspheric lens surface vertex,
- C is the curvature (=1/the radius of curvature, R in mm) of the aspheric lens surface on the optical axis,
- Y is the distance (in mm) from the optical axis,
- K is the eccentricity, and
- $A_i$ is the ith aspheric coefficient, and the summation extends over i, where i is greater than or equal to three.

The aspheric lens surfaces S1 and S2 may be defined by at least one even order non-zero aspheric coefficient $A_i$ and at least one odd order non-zero aspheric coefficient $A_i$ in Equation (A) above. However, in Embodiment 3, shown in FIG. 3, the image side surface S5 of the lens element L22 of the first lens group G1 is an aspheric lens surface defined by Equation (A) above with at least one aspheric coefficient $A_i$ of sixteenth order or higher being non-zero. Additionally, preferably at least one aspheric coefficient $A_i$ of even order and of sixteenth or higher order is non-zero and at least one aspheric coefficient $A_i$ of odd order and of sixteenth or higher order is non-zero for at least one aspheric lens surface of said first lens group using Equation (A) above, as shown by Embodiment 3.

In Embodiments 1–4, the second lens group G2 is formed of, in order from the object side, third to fifth lens elements L3 to L5. The entire second lens group G2 moves orthogonally to the optical axis Z1 in order to prevent blurring of an image by movements, such as hand shaking, of the zoom lens.

As mentioned above, the zoom lens including a function of preventing blurring of an image of the present invention is formed of, in order from the object side, the first lens group G1 having negative refractive power, the second lens group G2 having positive refractive power, and the third lens group G3 having positive refractive power. The distances between these three lens groups change during zooming as described above, light emerging from the third lens group G3 toward the image pickup surface is nearly collimated, and the length of the zoom lens remains relatively small during zooming. Additionally, by the first lens group G1 including (in order from the object side) a first lens element having negative refractive power and a second lens element having positive refractive power, such a construction enables a wide-angle zoom lens to be made. Also, the first lens group includes at least one aspheric lens surface that enables satisfactorily correcting, in particular, field curvature and distortion.

Additionally, the zoom lens of the present invention satisfies the following Condition (1):

$$\beta 2t < -1.5 \quad \text{Condition (1)}$$

where
- $\beta 2t$ is the image magnification of the second lens group G2 at the telephoto end.

Condition (1) above defines the image magnification $\beta 2t$ of the second lens group G2 at the telephoto end. Satisfying Condition (1) enables preventing blurred images in a highly sensitive manner by moving the second lens group G2 orthogonally to the optical axis Z1 by small amounts. When Condition (1) is not satisfied, the second lens group G2 is required to move more for sufficiently preventing blurred images, which makes it difficult to achieve an overall compact configuration and highly responsive blurred image prevention.

The second lens group G2 includes, arranged in order from the object side, a doublet formed of a third lens element L3 having positive refractive power and a fourth lens element L4 having negative refractive power, and a fifth lens element L5 having a meniscus shape with its concave surface on the image side so as to enable satisfactorily correcting axial chromatic aberration and achieving an overall compact zoom lens. The fifth lens element L5 having aspheric lens surfaces on either side serves to satisfactorily correct field curvature, distortion, and spherical aberration. Particularly, the aspheric lens surfaces S9 and S10 are defined by Equation (A) above. In Embodiments 1–4, lens element L3 is a biconvex lens element and in Embodiments 1, 3, and 4, lens element L4 is a biconcave lens element. However, in Embodiment 2, shown in FIG. 2, lens element L4 is a lens element having negative refractive power and a meniscus shape with its concave surface on the object side.

The third lens group G3 is formed of a sixth lens element L6, which is, in exemplary Embodiments 1–4, a biconvex lens element. The third lens group G3 moves along the optical axis Z1 toward the object side during focusing from infinity to close range.

It is desirable that the zoom lens of the present invention satisfy the following Condition (2):

$$0.05 \text{ mm} < (ft \cdot \tan \Delta\theta)/|\beta 3t \cdot (1-\beta 2t)| < 0.1 \text{ mm} \quad \text{Condition (2)}$$

where ft is the focal length of the zoom lens at the telephoto end;
$\Delta\theta$ is the field angle of correction at the telephoto end;
$\beta 3t$ is the image magnification of the third lens group G3 at the telephoto end; and
$\beta 2t$ is as defined above.

The term $(ft \cdot \tan \Delta\theta)/|\beta 3t(1-\beta 2t)|$ of Condition (2) is the maximum movement required of the lens group G2 for preventing a blurred image (hereinafter, simply termed the 'maximum movement M').

It is further desirable that the zoom lens of the present invention satisfy the following Condition (3):

$$|\beta 3t \cdot (1-\beta 2t)| > 1.9 \quad \text{Condition (3)}$$

where the variables $\beta 3t$ and $\beta 2t$ are as defined above.

Conditions (2) and (3) above define the maximum movement M. The relationship between the maximum movement M of the second lens group G2 at the telephoto end and the S corresponding image shift $\Delta Y$ on the imaging surface Simg is expressed by the following Equation (B):

$$|\beta 3t \cdot (1-\beta 2t)| \cdot M = \Delta Y \quad \text{Equation (B)}$$

where the variables $\beta 3t$ and $\beta 2t$ are as defined above.

A shift $\Delta Y$ is expressed by the following Equation (C):

$$\Delta Y = ft \cdot \tan \Delta\theta \quad \text{Equation (C)}$$

where the variables ft and $\Delta\theta$ are as defined above.

The following is derived from Equations (B) and (C) above:

$$|\beta 3t \cdot (1-\beta 2t)| = (ft \cdot \tan \Delta\theta)/M$$

so that, by rearranging:

$$M = (ft \cdot \tan \Delta\theta)/|\beta 3t \cdot (1-\beta 2t)| \quad \text{Equation (D)}.$$

The quantity on the right side of Equation (D) is the quantity controlled by Condition (2) above.

The field angle of correction $\Delta\theta$ is generally required to be 0.5 degrees or larger. With Condition (2) above being satisfied, the field angle of correction $\Delta\theta$ may be, for example, 0.5 degrees. When Conditions (2) and (3) are satisfied, a proper maximum movement M is obtained and excellent prevention of a blurred image is achieved. When the upper limit of Condition (2) is not satisfied, the maximum movement M of the second lens group G2 is excessively increased, which is disadvantageous for a small size zoom lens. When the lower limit of Condition (2) is not satisfied, attempts to correct blurring of the image are conducted in a highly sensitive manner, which makes it difficult to properly control the maximum movement M of the second lens group G2. When Condition (3) is not satisfied, correction of blurring of the image is conducted in a less sensitive manner and the maximum movement M of the second lens group G2 for sufficiently preventing a blurred image is increased.

Additionally, with particular regard to lens group G2, it is further desirable that the zoom lens of the present invention satisfy the following Conditions (4) and (5):

$$\nu 3 - \nu 4 \geq 15 \quad \text{Condition (4)}$$

$$d/fw \leq 0.25 \quad \text{Condition (5)}$$

where $\nu 3$ is the Abbe number at the d-line of the lens element having positive refractive power (L3) of the doublet of the second lens group G2;
$\nu 4$ is the Abbe number at the d-line of the lens element having negative refractive power (L4) of the doublet of the second lens group G2;
d is the distance along the optical axis between lens elements L4 and L5 of the second lens group G2 (which corresponds to D8 in Embodiments 1, 2, and 4 and corresponds to D9 in Embodiment 3); and
fw is the focal length of the zoom lens at the wide-angle end.

When Condition (4) above is satisfied, lateral color at the wide-angle end and axial chromatic aberration at the telephoto end are particularly well corrected. When Condition (5) is satisfied, the second lens group G2 can have a smaller overall thickness, which is advantageous for making the zoom lens smaller.

In the zoom lens of Embodiments 1, 2, and 4 of the present invention, the lens surfaces S1 and S2 of the first lens element L1 are defined by Equation (A) above with at least one odd order and one even order aspheric coefficient Ai being non-zero. In the zoom lens of Embodiment 3 of the present invention, as shown in FIG. 3, the image side surface S5 of the lens element L22 is defined by Equation (A) above with at least one aspheric coefficient Ai of sixteenth or higher order being non-zero. These features enable aberrations to be well corrected.

The zoom lens of the present invention having configurations as described above achieves a proper maximum movement M of the second lens group G2 and excellently prevents a blurred image, while enabling a zoom lens that has a compact configuration and that satisfactorily corrects aberrations.

Embodiments 1–4 of the present invention will now be individually described with further reference to the drawings.

Embodiment 1

FIG. 1 shows cross-sectional views of the zoom lens of Embodiment 1 of the present invention at the wide-angle end (WIDE) and at the telephoto end (TELE).

Table 1 below lists the lens group designation (or cover glass GC) and the surface number #, in order from the object side, the radius of curvature R (in mm) of each surface on the optical axis, the on-axis surface spacing D (in mm), except that the on-axis surface spacings that vary with zooming are listed in Table 3 below, as well as the refractive index $N_d$ and the Abbe number $\nu_d$ at the d-line (587.6 nm) of each optical element for Embodiment 1. Note that although R is the on-axis radius of curvature, for convenience of illustration, in FIG. 1 the lead lines from the R reference symbols extend to the surfaces being referenced but do not extend to the on-axis positions.

TABLE 1

| Lens Group | # | R | D | $N_d$ | $v_d$ |
|---|---|---|---|---|---|
| 1 | 1* | 289.1745 | 1.00 | 1.80348 | 40.4 |
| 1 | 2* | 5.6490 | 2.16 | | |
| 1 | 3 | 8.1430 | 1.83 | 1.92286 | 20.9 |
| 1 | 4 | 13.5774 | D4 (variable) | | |
| 2 | 5 | ∞ (stop) | 0.40 | | |
| 2 | 6 | 5.5720 | 3.54 | 1.71300 | 53.9 |
| 2 | 7 | −5.5720 | 0.56 | 1.66680 | 33.1 |
| 2 | 8 | 7.1924 | 0.15 | | |
| 2 | 9* | 5.7845 | 1.05 | 1.56865 | 58.6 |
| 2 | 10* | 7.6893 | D10 (variable) | | |
| 3 | 11 | 24.9237 | 1.81 | 1.48749 | 70.2 |
| 3 | 12 | −24.9237 | 4.05 | | |
| GC | 13 | ∞ | 0.91 | 1.51680 | 64.2 |
| GC | 14 | ∞ | 0.00 | | |

The lens surfaces with a * to the right of the surface number in Table 1 are aspheric lens surfaces, and the aspheric lens surface shape of these lens surfaces is expressed by Equation (A) above. In the zoom lens of Embodiment 1, the lens surfaces S1 and S2 of the first lens element L1 in the first lens group G1 and the lens surfaces S9 and S10 of the fifth lens element L5 in the second lens group G2 are aspheric.

Table 2 below lists the values of the constant K and the aspheric coefficients $A_3$–$A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_3$ | $A_4$ | $A_5$ | $A_6$ |
|---|---|---|---|---|---|
| 1 | −1.6541660 | −1.7066764E-4 | 2.0859084E-3 | −5.2991230E-4 | −2.8005201E-5 |
| 2 | −0.2646114 | −3.6236190E-4 | 3.2772158E-3 | −7.3500188E-4 | 1.7210526E-5 |
| 9 | −3.9999935 | 0 | 3.3683977E-3 | 0 | −1.9741958E-4 |
| 10 | 0.1092475 | 0 | 3.6796439E-3 | 0 | 3.3159871E-5 |

| # | $A_7$ | $A_8$ | $A_9$ | $A_{10}$ |
|---|---|---|---|---|
| 1 | 3.2753797E-5 | −4.7044463E-6 | 1.2466006E-7 | 1.1261201E-8 |
| 2 | 2.4496153E-5 | −5.6434100E-7 | −6.9394753E-7 | 6.0890837E-8 |
| 9 | 0 | −1.4767677E-5 | 0 | −1.6776015E-7 |
| 10 | 0 | −1.8135579E-5 | 0 | −1.4023255E-7 |

As shown in Table 2 above, the aspheric lens surfaces of the zoom lens of Embodiment 1 are defined effectively using non-zero aspheric coefficients $A_i$ of not only even order terms but also odd order terms.

In the zoom lens of Embodiment 1 both the first lens group G1 and the second lens group G2 move during zooming. Therefore, the on-axis spacings D4 and D10 change with zooming. With zooming, the focal length f, the f-number $F_{NO}$, and the field angle, that is, the angle of view, $2\omega$, of the zoom lens also change. Table 3 below lists the values of the focal length f (in mm), the f-number $F_{NO}$, the field angle $2\omega$ (in degrees), and the variables D4 and D10 (in mm) at the wide-angle end (f=5.8 mm) and at the telephoto end (f=15.95 mm) when the zoom lens is focused at infinity.

TABLE 3

| f | $F_{NO}$ | $2\omega$ | D4 | D10 |
|---|---|---|---|---|
| 5.8 | 2.9 | 62.3 | 14.56 | 5.28 |
| 15.95 | 5.0 | 23.7 | 2.85 | 16.17 |

As set forth in Table 4 below, the zoom lens of Embodiment 1 of the present invention satisfies all of Conditions (1) through (5) above, with Condition (2) being applied to the maximum movement M of the second lens group G2 associated with a field angle of correction of 0.5 degrees.

TABLE 4

| Condition No. | Condition | Value |
|---|---|---|
| (1) | $\beta 2t < -1.5$ | −1.60 |
| (2) | 0.05 mm < M (for field angle of correction of 0.5°) < 0.1 mm | 0.067 |
| (3) | $|\beta 3t \cdot (1 - \beta 2t)| > 1.9$ | 2.07 |
| (4) | $v3 - v4 \geq 15$ | 20.8 |
| (5) | $d/fw \leq 0.25$ | 0.026 |

FIGS. 5A–5D show the spherical aberration, astigmatism, distortion, and lateral color, respectively, of the zoom lens of Embodiment 1 at the wide-angle end, and FIGS. 6A–6D show the spherical aberration, astigmatism, distortion, and lateral color, respectively, of the zoom lens of Embodiment 1 at the telephoto end. These are aberrations obtained when the second lens group G2 for preventing a blurred image is at its normal position and under no influence of movement of the zoom lens, such as movement or vibration due to shaky hands holding the zoom lens. In FIGS. 5A and 6A, the spherical aberration (in mm) is shown for the wavelengths 587.6 nm (the d-line and indicated by a solid line), 460 nm (indicated by a dashed line), and 615 nm (indicated by a double dashed line), and the f-number (FNO.) is shown. In the remaining figures, $\omega$ is the half-field angle. In FIGS. 5B and 6B, the astigmatism (in mm) is shown for both the sagittal image surface S and the tangential image surface T and is measured at 587.6 nm (the d-line). In FIGS. 5C and 6C, distortion (in per cent) is measured at 587.6 nm (the d-line). In FIGS. 5D and 6D, the lateral color (in μm) is shown for the wavelengths 460 nm and 615 nm relative to 587.6 nm (the d-line).

Figure 7:
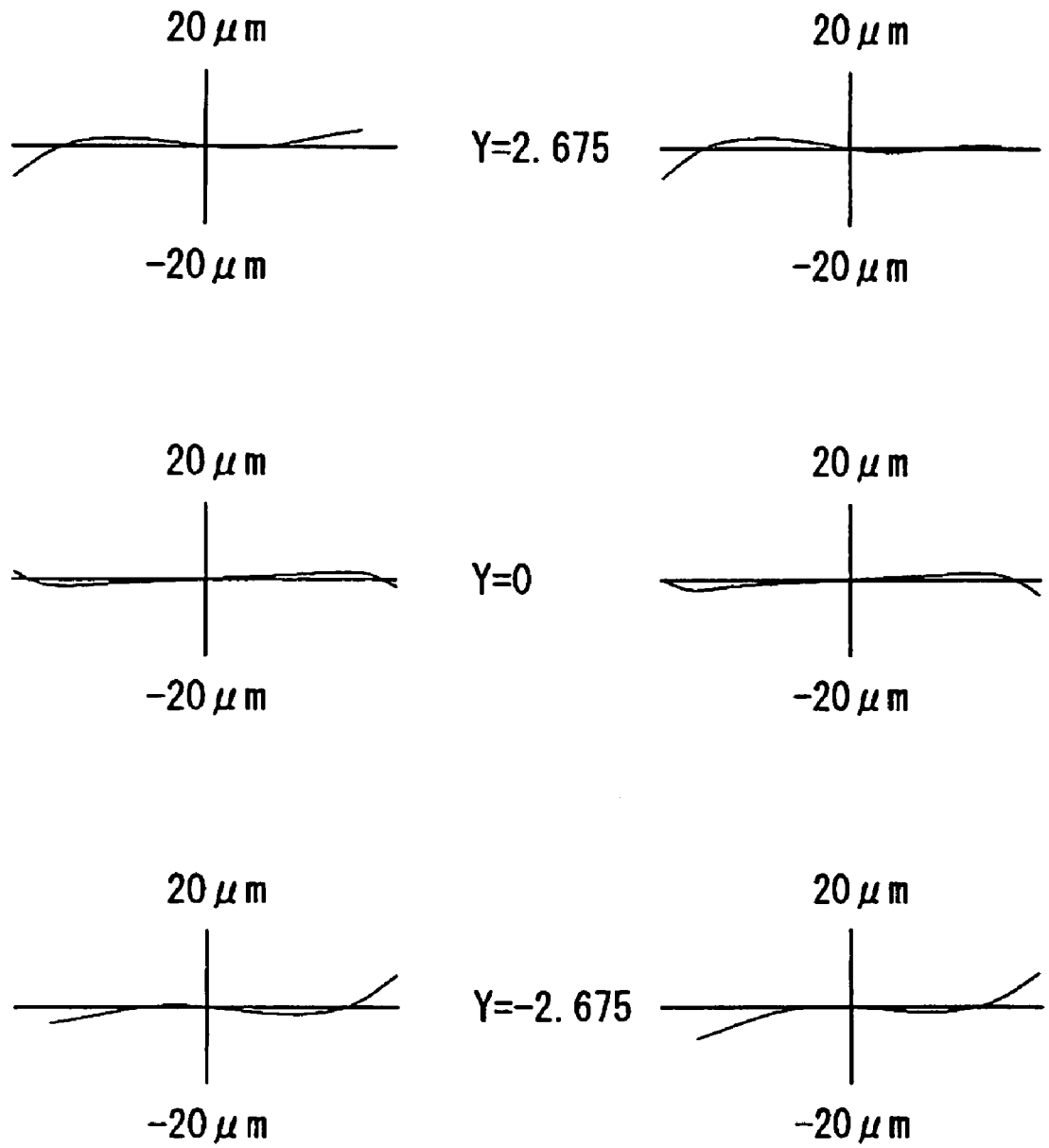
FIG. 7 shows the coma aberrations of the zoom lens of Embodiment 1 of the present invention at the telephoto end under normal conditions and under conditions of preventing blurring.

FIG. 7 shows coma aberrations (in μm) of the zoom lens of Embodiment 1 of the present invention at the telephoto end under normal conditions on the left side of FIG. 7, and under conditions of preventing blurring on the right side of FIG. 7. Specifically, the right side of FIG. 7 shows coma aberrations during corrective movement of the second lens group G2 in order to prevent a blurred image with a field angle of correction of 0.5 degrees at the telephoto end. Each graph of FIG. 7 shows coma aberrations at a wavelength of 587.6 nm (the d-line), with Y denoting the distance from the optical axis to the image point, that is, the image height (in mm). As is evident from FIG. 7, the changes in coma aberrations during correction for preventing blurring of an image are very small in Embodiment 1.

Additionally, as seen from the numerical data above and the figures discussed above, Embodiment 1 provides a high performance zoom lens that can maintain excellent optical performance during the correction for preventing blurring of an image while providing a compact zoom lens.

Embodiment 2

FIG. 2 shows cross-sectional views of the zoom lens of Embodiment 2 of the present invention at the wide-angle end (WIDE) and at the telephoto end (TELE) with the zoom lens focused at infinity.

Table 5 below lists the lens group designation (or cover glass GC) and the surface number #, in order from the object side, the radius of curvature R (in mm) of each surface on the optical axis, the on-axis surface spacing D (in mm), except that the on-axis surface spacings that vary with zooming are listed in Table 7 below, as well as the refractive index $N_d$ and the Abbe number $v_d$ at the d-line (587.6 nm) of each optical element for Embodiment 2. Note that although R is the on-axis radius of curvature, for convenience of illustration, in FIG. 2 the lead lines from the R reference symbols extend to the surfaces being referenced but do not extend to the on-axis positions.

TABLE 5

| Lens Group | # | R | D | $N_d$ | $v_d$ |
|---|---|---|---|---|---|
| 1 | 1* | 104.7414 | 1.30 | 1.80348 | 40.4 |
| 1 | 2* | 7.0001 | 3.02 | | |
| 1 | 3 | 11.8143 | 2.05 | 1.92286 | 20.9 |
| 1 | 4 | 21.5413 | D4 (variable) | | |

TABLE 5-continued

| Lens Group | # | R | D | $N_d$ | $v_d$ |
|---|---|---|---|---|---|
| 2 | 5 | ∞ (stop) | 0.40 | | |
| 2 | 6 | 7.1369 | 4.51 | 1.58913 | 61.2 |
| 2 | 7 | −14.1000 | 0.55 | 1.84666 | 23.8 |
| 2 | 8 | −63.9180 | 1.75 | | |
| 2 | 9* | 10.7864 | 1.05 | 1.68458 | 30.9 |
| 2 | 10* | 7.4718 | D10 (variable) | | |
| 3 | 11* | 30.0271 | 1.64 | 1.56865 | 58.6 |
| 3 | 12* | −219.3569 | D12 (variable) | | |
| GC | 13 | ∞ | 1.08 | 1.51680 | 64.2 |
| GC | 14 | ∞ | 0.00 | | |

The lens surfaces with a * to the right of the surface number in Table 5 are aspheric lens surfaces, and the aspheric lens surface shape of these lens surfaces is expressed by Equation (A) above. In the zoom lens of Embodiment 2, the lens surfaces S1 and S2 of the first lens element L1 in the first lens group G1, the lens surfaces S9 and S10 of the fifth lens element L5 in the second lens group G2, and the lens surfaces S11 and S12 of the sixth lens element L6 in the third lens group G3 are aspheric.

Table 6 below lists the values of the constant K and the aspheric coefficients $A_3$–$A_{10}$ used in Equation (A) above for each of the aspheric lens surfaces of Table 5. Aspheric coefficients that are not present in Table 6 are zero. An "E" in the data indicates that the number following the "E" is the exponent to the base 10. For example, "1.0E-2" represents the number $1.0 \times 10^{-2}$.

TABLE 6

| # | K | $A_3$ | $A_4$ | $A_5$ | $A_6$ |
|---|---|---|---|---|---|
| 1 | 1.0362103 | −6.0583379E-4 | 4.0174116E-4 | 1.4730508E-4 | −1.2629818E-4 |
| 2 | −1.7614660 | −6.0238634E-4 | 1.3114492E-3 | 1.0015586E-4 | −1.0377569E-4 |
| 9 | 8.1469301 | −1.8330303E-3 | −6.7162676E-4 | −2.4443340E-4 | −2.3407670E-4 |
| 10 | −6.1871509 | −2.5314989E-3 | 3.9248926E-3 | −1.3206635E-3 | 1.8171921E-4 |
| 11 | 1.0263360 | −4.3344289E-3 | 1.7373363E-3 | 5.3891898E-5 | −2.0677963E-4 |
| 12 | 0.9832135 | −5.4290344E-3 | 3.6620029E-3 | −1.2511728E-3 | 2.4238233E-4 |

| # | $A_7$ | $A_8$ | $A_9$ | $A_{10}$ |
|---|---|---|---|---|
| 1 | 3.2022613E-5 | −3.9131878E-6 | 2.3608273E-7 | −5.6498884E-9 |
| 2 | 1.5186198E-5 | 6.0789718E-7 | −2.7421593E-7 | 1.5088000E-8 |
| 9 | 7.2735733E-5 | −3.9351025E-6 | −1.2144146E-6 | −1.9886882E-7 |
| 10 | −1.0381765E-5 | 1.0167000E-6 | −1.8806586E-7 | −2.4605965E-8 |
| 11 | 4.9374395E-5 | −2.4986445E-6 | −3.7585794E-7 | 3.3987733E-8 |
| 12 | −2.7369776E-5 | 1.3461870E-6 | 1.7729211E-7 | −2.6259422E-8 |

As shown in Table 6 above, the aspheric lens surfaces of the zoom lens of Embodiment 2 are defined effectively using non-zero aspheric coefficients $A_i$ of not only even order terms but also odd order terms.

In the zoom lens of Embodiment 2 the first lens group G1, the second lens group G2, and the third lens group G3 move during zooming. Therefore, the on-axis spacings D4, D10, and D12 change with zooming. With zooming, the focal length f, the f-number $F_{NO}$, and the field angle, that is, the angle of view, 2ω, of the zoom lens also change. Table 7 below lists the values of the focal length f (in mm), the f-number $F_{NO}$, the field angle 2ω (in degrees), and the variables D4, D10, and D12 (in mm) at the wide-angle end (f=7.5 mm), at an intermediate focal length (f=14.3 mm), and at the telephoto end (f=27.5 mm) when the zoom lens is focused at infinity.

TABLE 7

| f | $F_{NO}$ | 2ω | D4 | D10 | D12 |
|---|---|---|---|---|---|
| 7.5 | 2.9 | 68.9 | 23.36 | 8.21 | 4.59 |
| 14.3 | 3.9 | 37.2 | 9.27 | 13.48 | 6.30 |
| 27.5 | 6.0 | 19.8 | 3.03 | 29.21 | 3.66 |

As set forth in Table 8 below, the zoom lens of Embodiment 2 of the present invention satisfies all of Conditions (1) through (5) above, with Condition (2) being applied to the maximum movement M associated with a field angle of correction of 0.5 degrees.

TABLE 8

| Condition No. | Condition | Value |
|---|---|---|
| (1) | β2t < −1.5 | −1.87 |
| (2) | 0.05 mm < M (for field angle of correction of 0.5°) < 0.1 mm | 0.094 |
| (3) | |β3t · (1 − β2t)| > 1.9 | 2.54 |
| (4) | ν3 − ν4 ≧ 15 | 37.4 |
| (5) | d/fw ≦ 0.25 | 0.233 |

FIGS. 8A–8D show the spherical aberration, astigmatism, distortion, and lateral color, respectively, of the zoom lens of Embodiment 2 at the wide-angle end, and FIGS. 9A–9D show the spherical aberration, astigmatism, distortion, and lateral color, respectively, of the zoom lens of Embodiment 2 at the telephoto end. These are aberrations obtained when the second lens group G2 for preventing a blurred image is at its normal position and under no influence of movement of the zoom lens, such as movement or vibration due to shaky hands holding the zoom lens. In FIGS. 8A and 9A, the spherical aberration (in mm) is shown for the wavelengths 587.6 nm (the d-line and indicated by a solid line), 460 nm (indicated by a dashed line), and 615 nm (indicated by a double dashed line), and the f-number (FNO.) is shown. In the remaining figures, ω is the half-field angle. In FIGS. 8B and 9B, the astigmatism (in mm) is shown for both the sagittal image surface S and the tangential image surface T and is measured at 587.6 nm (the d-line). In FIGS. 8C and 9C, distortion (in per cent) is measured at 587.6 nm (the d-line). In FIGS. 8D and 9D, the lateral color (in μm) is shown for the wavelengths 460 nm and 615 nm relative to 587.6 nm (the d-line).

Figure 10:
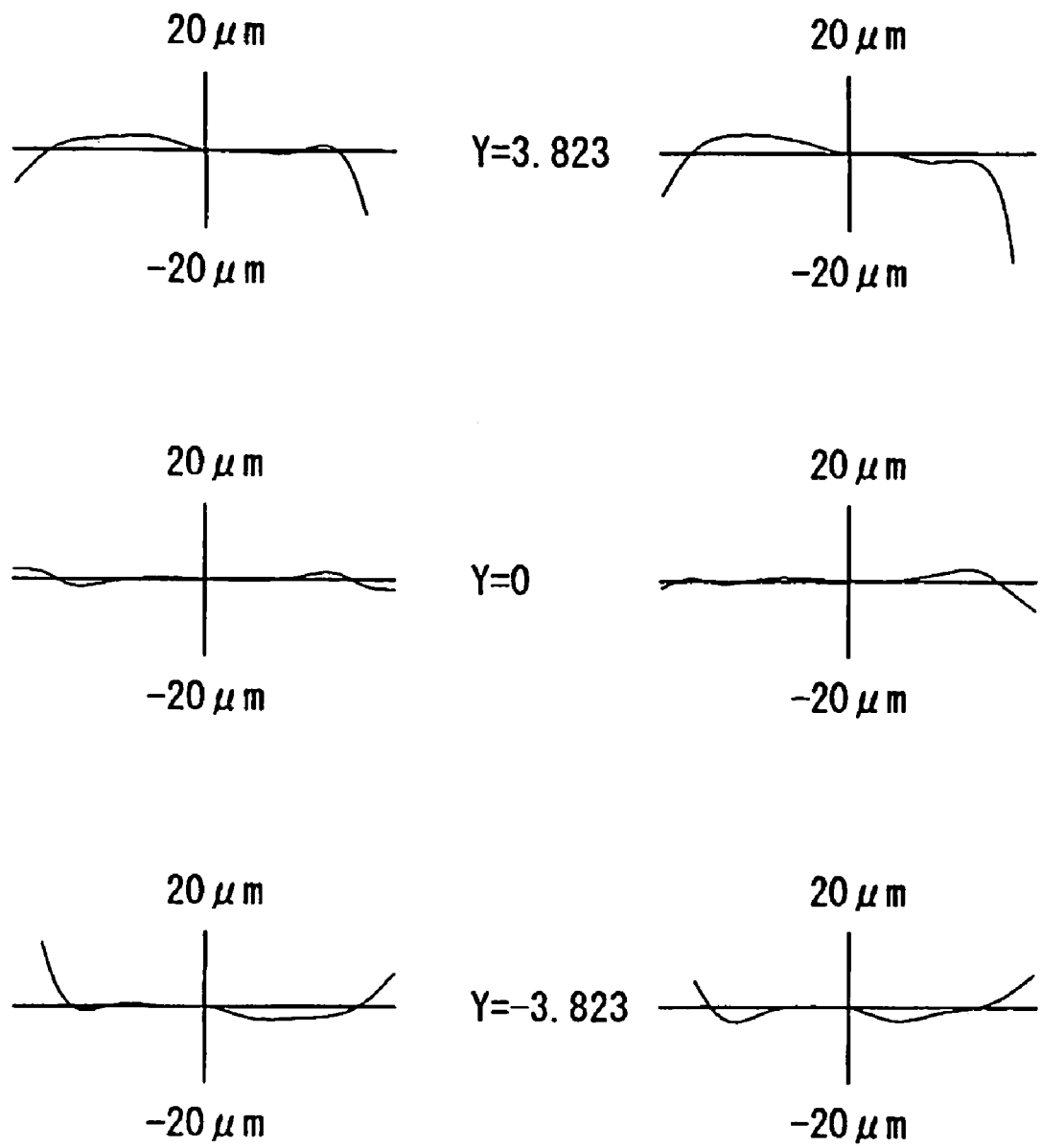
FIG. 10 shows the coma aberrations of the zoom lens of Embodiment 2 of the present invention at the telephoto end under normal conditions and under conditions of preventing blurring.

FIG. 10 shows coma aberrations (in μm) of the zoom lens of Embodiment 2 of the present invention at the telephoto end under normal conditions on the left side of FIG. 10, and under conditions of preventing blurring on the right side of FIG. 10. Specifically, the right side of FIG. 10 shows coma aberrations during corrective movement of the second lens group G2 in order to prevent a blurred image with a field angle of correction of 0.5 degrees at the telephoto end. Each graph of FIG. 10 shows coma aberrations at a wavelength of 587.6 nm (the d-line), with Y denoting the distance from the optical axis to the image point, that is, the image height (in mm).

As is evident from FIG. 10, the changes in aberrations during the correction for preventing blurring of an image are very small in Embodiment 2.

Additionally, as seen from the numerical data above and the figures discussed above, Embodiment 2 provides a high performance zoom lens that can maintain excellent optical performance during the correction for preventing blurring of an image while providing a compact zoom lens.

Embodiment 3

FIG. 3 shows cross-sectional views of the zoom lens of Embodiment 3 of the present invention at the wide-angle end (WIDE) and at the telephoto end (TELE) with the zoom lens focused at infinity.

Table 9 below lists the lens group designation (or cover glass GC) and the surface number #, in order from the object side, the radius of curvature R (in mm) of each surface on the optical axis, the on-axis surface spacing D (in mm), except that the on-axis surface spacings that vary with zooming are listed in Table 11 below, as well as the refractive index $N_d$ and the Abbe number $ν_d$ at the d-line (587.6 nm) of each optical element for Embodiment 3. Note that although R is the on-axis radius of curvature, for convenience of illustration, in FIG. 3 the lead lines from the R reference symbols extend to the surfaces being referenced but do not extend to the on-axis positions.

TABLE 9

| Lens Group | # | R | D | $N_d$ | $ν_d$ |
|---|---|---|---|---|---|
| 1 | 1 | 41.9926 | 0.65 | 1.88300 | 40.8 |
| 1 | 2 | 5.9473 | 1.49 | | |
| 1 | 3 | 12.0950 | 2.06 | 1.84666 | 23.8 |
| 1 | 4 | 158.7548 | 0.15 | 1.52771 | 41.8 |
| 1 | 5* | 31.5220 | D5 (variable) | | |
| 2 | 6 | ∞ (stop) | 0.30 | | |
| 2 | 7 | 5.1063 | 2.76 | 1.72916 | 54.7 |
| 2 | 8 | −9.7430 | 0.86 | 1.64769 | 33.8 |
| 2 | 9 | 4.4783 | 0.26 | | |
| 2 | 10* | 5.2538 | 1.22 | 1.69098 | 52.9 |
| 2 | 11* | 8.3863 | D11 (variable) | | |
| 3 | 12 | 47.0184 | 1.57 | 1.60311 | 60.7 |
| 3 | 13 | −23.0739 | D13 (variable) | | |
| GC | 14 | ∞ | 0.91 | 1.51680 | 64.2 |
| GC | 15 | ∞ | 0.00 | | |

The lens surfaces with a * to the right of the surface number in Table 9 are aspheric lens surfaces, and the aspheric lens surface shape of these lens surfaces is expressed by Equation (A) above. In the zoom lens of Embodiment 3, the lens surface S5 on the image side of the first lens group G1 and the lens surfaces S10 and S11 of the fifth lens element L5 in the second lens group G2 are aspheric.

Table 10 below lists the values of the constant K and the aspheric coefficients $A_3$–$A_{16}$ used in Equation (A) above for each of the aspheric lens surfaces of Table 9. Aspheric coefficients that are not present in Table 10 are zero. An "E" in the data indicates that the number following the "E" is the exponent to the base 10. For example, "1.0E-2" represents the number $1.0 \times 10^{-2}$.

TABLE 10

| # | K | $A_3$ | $A_4$ | $A_5$ | $A_6$ |
|---|---|---|---|---|---|
| 5 | −6.3917124 | −6.6690433E−4 | 3.8310677E−4 | −4.4501592E−4 | 2.5602583E−5 |
| 10 | −0.2327304 | −2.7603257E−3 | 3.5139750E−3 | −2.1897989E−3 | 3.8877658E−4 |
| 11 | −38.5314294 | −2.8498758E−3 | 1.4420211E−2 | −4.9204559E−3 | 2.8859637E−4 |

| # | $A_7$ | $A_8$ | $A_9$ | $A_{10}$ | $A_{11}$ |
|---|---|---|---|---|---|
| 5 | 6.2732747E−5 | −2.9802226E−5 | 5.9605717E−6 | −4.8157560E−7 | −1.0291161E−8 |
| 10 | 4.3846027E−6 | −2.9849024E−5 | −1.3239977E−6 | −3.2374333E−7 | 0 |
| 11 | 9.4694960E−5 | −1.1408042E−5 | 7.8517603E−7 | −1.0521525E−7 | 0 |

| # | $A_{12}$ | $A_{13}$ | $A_{14}$ | $A_{15}$ | $A_{16}$ |
|---|---|---|---|---|---|
| 5 | −5.4125769E−10 | 3.5201185E−10 | 1.1724818E−10 | 1.3592120E−11 | −5.7630661E−12 |
| 10 | 0 | 0 | 0 | 0 | 0 |
| 11 | 0 | 0 | 0 | 0 | 0 |

As shown in Table 10 above, the aspheric lens surfaces of the zoom lens of Embodiment 3 are defined effectively using non-zero aspheric coefficients $A_i$ of not only even order terms but also odd order terms. Additionally, the image side lens surface S5 of lens element L22 of Embodiment 3 is defined using non-zero aspheric coefficients $A_i$ in the third to sixteenth order terms in Equation (A) above.

In the zoom lens of Embodiment 3 the first lens group G1, the second lens group G2, and the third lens group G3 move during zooming. Therefore, the on-axis spacings D5, D11, and D13 change with zooming. With zooming, the focal length f, the f-number $F_{NO}$, and the field angle, that is, the angle of view, 2ω, of the zoom lens also change. Table 11 below lists the values of the focal length f (in mm), the f-number $F_{NO}$, the field angle 2ω (in degrees), and the variables D5, D11, and D13 (in mm) at the wide-angle end (f=6.6 mm), at an intermediate focal length (f=11.7 mm), and at the telephoto end (f=20.8 mm) when the zoom lens is focused at infinity.

TABLE 11

| f | $F_{NO}$ | 2ω | D5 | D11 | D13 |
|---|---|---|---|---|---|
| 6.6 | 2.9 | 60.9 | 14.88 | 5.23 | 4.32 |
| 11.7 | 3.9 | 34.6 | 6.20 | 10.39 | 3.97 |
| 20.8 | 5.6 | 19.8 | 1.70 | 19.46 | 2.49 |

As set forth in Table 12 below, the zoom lens of Embodiment 3 of the present invention satisfies all of Conditions (1) through (5) above, with Condition (2) being applied to the maximum movement M associated with a field angle of correction of 0.5 degrees.

TABLE 12

| Condition No. | Condition | Value |
|---|---|---|
| (1) | β2t < −1.5 | −1.60 |
| (2) | 0.05 mm < M (for field angle of correction of 0.5°) < 0.1 mm | 0.080 |
| (3) | \|β3t · (1 − β2t)\| > 1.9 | 2.26 |
| (4) | ν3 − ν4 ≧ 15 | 20.9 |
| (5) | d/fw ≦ 0.25 | 0.039 |

FIGS. 11A–11D show the spherical aberration, astigmatism, distortion, and lateral color, respectively, of the zoom lens of Embodiment 3 at the wide-angle end, and FIGS. 12A–12D show the spherical aberration, astigmatism, distortion, and lateral color, respectively, of the zoom lens of Embodiment 3 at the telephoto end. These are aberrations obtained when the second lens group G2 for preventing a blurred image is at its normal position and under no influence of movement of the zoom lens, such as movement or vibration due to shaky hands holding the zoom lens. In FIGS. 11A and 12A, the spherical aberration (in mm) is shown for the wavelengths 587.6 nm (the d-line and indicated by a solid line), 460 nm (indicated by a dashed line), and 615 nm (indicated by a double dashed line), and the f-number (FNO.) is shown. In the remaining figures, ω is the half-field angle. In FIGS. 11B and 12B, the astigmatism (in mm) is shown for both the sagittal image surface S and the tangential image surface T and is measured at 587.6 nm (the d-line). In FIGS. 11C and 12C, distortion (in per cent) is measured at 587.6 nm (the d-line). In FIGS. 11D and 12D, the lateral color (in μm) is shown for the wavelengths 460 nm and 615 nm relative to 587.6 nm (the d-line).

Figure 13:
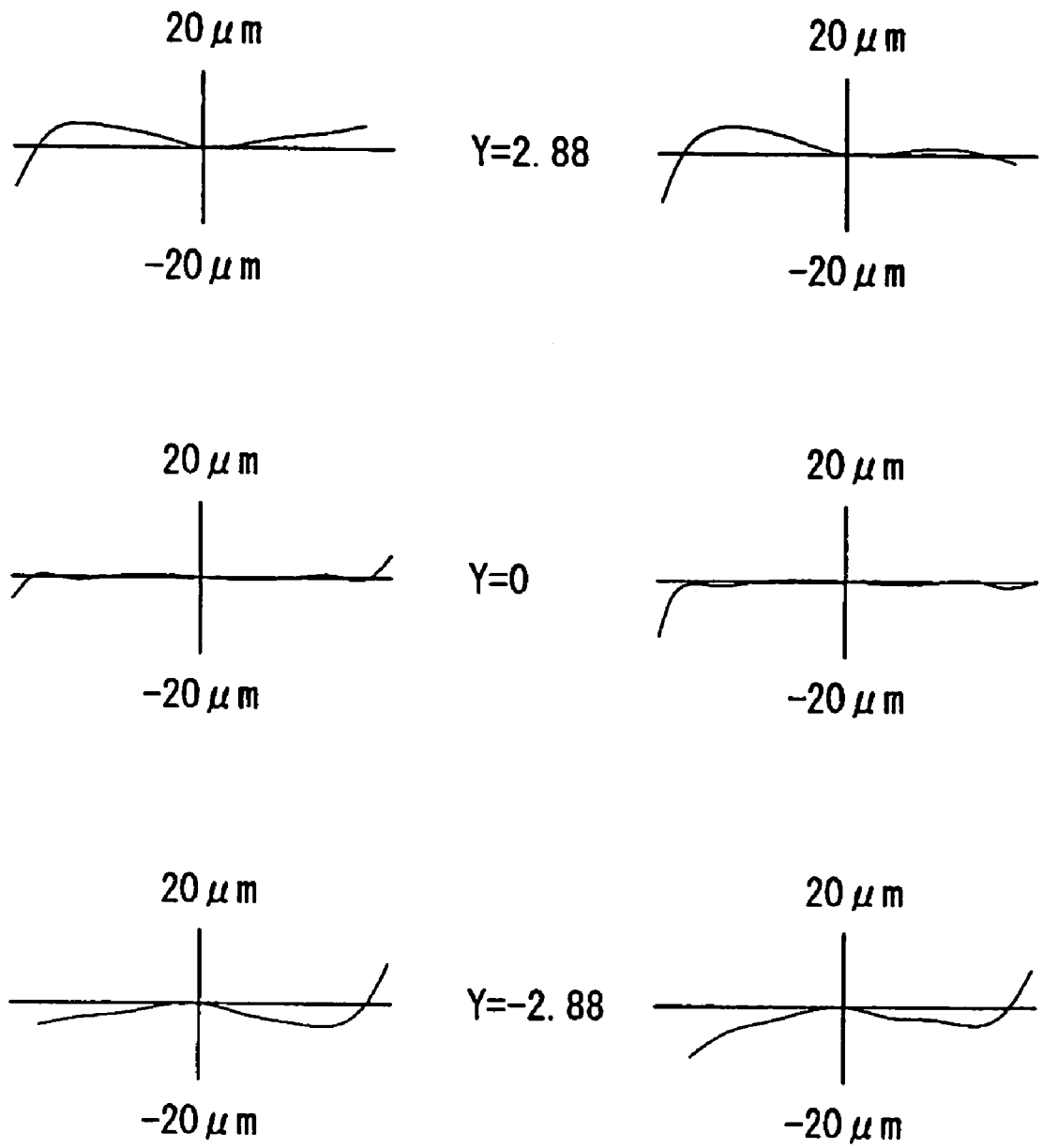
FIG. 13 shows the coma aberrations of the zoom lens of Embodiment 3 of the present invention at the telephoto end under normal conditions and under conditions of preventing blurring.

FIG. 13 shows coma aberrations (in μm) of the zoom lens of Embodiment 3 of the present invention at the telephoto end under normal conditions on the left side of FIG. 13, and under conditions of preventing blurring on the right side of FIG. 13. Specifically, the right side of FIG. 13 shows coma aberrations during corrective movement of the second lens group G2 in order to prevent a blurred image with a field angle of correction of 0.5 degrees at the telephoto end. Each graph of FIG. 13 shows coma aberrations at a wavelength of 587.6 nm (the d-line), with Y denoting the distance from the optical axis to the image point, that is, the image height (in mm).

As is evident from FIG. 13, the changes in aberrations during the correction for preventing blurring of an image are very small in Embodiment 3.

Additionally, as seen from the numerical data above and the figures discussed above, Embodiment 3 provides a high performance zoom lens that can maintain excellent optical performance during the correction for preventing blurring of an image while providing a compact zoom lens.

Embodiment 4

FIG. 4 shows cross-sectional views of the zoom lens of Embodiment 4 of the present invention at the wide-angle end (WIDE) and at the telephoto end (TELE) with the zoom lens focused at infinity.

Table 13 below lists the lens group designation (or cover glass GC) and the surface number #, in order from the object side, the radius of curvature R (in mm) of each surface on the optical axis, the on-axis surface spacing D (in mm), except that the on-axis surface spacings that vary with zooming are listed in Table 15 below, as well as the refractive index $N_d$ and the Abbe number $v_d$ at the d-line (587.6 nm) of each optical element for Embodiment 4. Note that although R is the on-axis radius of curvature, for convenience of illustration, in FIG. 4 the lead lines from the R reference symbols extend to the surfaces being referenced but do not extend to the on-axis positions.

TABLE 13

| Lens Group | # | R | D | $N_d$ | $v_d$ |
|---|---|---|---|---|---|
| 1 | 1* | 3999.3150 | 1.17 | 1.80348 | 40.4 |
| 1 | 2* | 6.5987 | 1.70 | | |
| 1 | 3 | 10.2182 | 2.41 | 1.84666 | 23.8 |
| 1 | 4 | 30.3780 | D4 (variable) | | |
| 2 | 5 | ∞ (stop) | 0.25 | | |
| 2 | 6 | 6.5100 | 4.16 | 1.71300 | 53.9 |
| 2 | 7 | −6.5100 | 0.56 | 1.64769 | 33.8 |
| 2 | 8 | 7.4633 | 0.22 | | |
| 2 | 9* | 7.1480 | 1.10 | 1.56865 | 58.6 |
| 2 | 10* | 9.1076 | D10 (variable) | | |
| 3 | 11 | 43.6721 | 1.65 | 1.72916 | 54.7 |
| 3 | 12 | −43.6721 | D12 (variable) | | |
| GC | 13 | ∞ | 1.12 | 1.51680 | 64.2 |
| GC | 14 | ∞ | 0.00 | | |

The lens surfaces with a * to the right of the surface number in Table 13 are aspheric lens surfaces, and the aspheric lens surface shape of these lens surfaces is expressed by Equation (A) above. In the zoom lens of Embodiment 4, the lens surfaces S1 and S2 of the first lens element L1 in the first lens group G1 and the lens surfaces S9 and S10 of the fifth lens element L5 in the second lens group G2 are aspheric.

Table 14 below lists the values of the constant K and the aspheric coefficients $A_3$–$A_{10}$ used in Equation (A) above for each of the aspheric lens surfaces of Table 13. Aspheric coefficients that are not present in Table 14 are zero. An "E" in the data indicates that the number following the "E" is the exponent to the base 10. For example, "1.0E-2" represents the number $1.0 \times 10^{-2}$.

TABLE 14

| # | K | $A_3$ | $A_4$ | $A_5$ | $A_6$ |
|---|---|---|---|---|---|
| 1 | 25.7113165 | −4.0925531E-4 | 7.1312710E-4 | −3.6146367E-4 | 9.6496028E-5 |
| 2 | −5.8693543 | −7.4084668E-4 | 3.9602579E-3 | −6.4870210E-4 | −3.6677763E-3 |
| 9 | 0.2865826 | −1.9282247E-3 | 3.0786842E-3 | −3.0673252E-3 | 1.3281493E-3 |
| 10 | −11.3058958 | −2.0573076E-3 | 6.8368318E-3 | −2.9318194E-3 | 7.9961646E-4 |

| # | $A_7$ | $A_8$ | $A_9$ | $A_{10}$ |
|---|---|---|---|---|
| 1 | −1.4125918E-5 | 1.1823425E-6 | −6.2272650E-8 | 2.0199212E-9 |
| 2 | 2.1995111E-5 | −1.0545756E-7 | −5.5113334E-7 | 4.7734785E-8 |
| 9 | −1.5207105E-4 | −1.3042089E-4 | 5.0845770E-5 | −5.9539596E-6 |
| 10 | −3.8139474E-6 | −8.5214063E-6 | −2.8131818E-5 | 6.9839692E-6 |

As shown in Table 14 above, the aspheric lens surfaces of the zoom lens of Embodiment 4 are defined effectively using non-zero aspheric coefficients $A_i$ of not only even order terms but also odd order terms.

In the zoom lens of Embodiment 4 the first lens group G1, the second lens group G2, and the third lens group G3 move during zooming. Therefore, the on-axis spacings D4, D10, and D12 change with zooming. With zooming, the focal length f, the f-number $F_{NO}$, and the field angle, that is, the angle of view, 2ω, of the zoom lens also change. Table 15 below lists the values of the focal length f (in mm), the f-number $F_{NO}$, the field angle 2ω (in degrees), and the variables D4, D10, and D12 (in mm) at the wide-angle end (f=8.2 mm) and at the telephoto end (f=23.3 mm) when the zoom lens is focused at infinity.

TABLE 15

| f | $F_{NO}$ | 2ω | D4 | D10 | D12 |
|---|---|---|---|---|---|
| 8.2 | 2.9 | 64.0 | 17.31 | 7.36 | 5.39 |
| 23.3 | 5.1 | 24.0 | 2.91 | 23.06 | 3.85 |

As set forth in Table 16 below, the zoom lens of Embodiment 4 of the present invention satisfies all of Conditions (1) through (5) above, with Condition (2) being applied to the maximum movement M associated with a field angle of correction of 0.5 degrees.

TABLE 16

| Condition No. | Condition | Value |
|---|---|---|
| (1) | β2t < −1.5 | −1.57 |
| (2) | 0.05 mm < M (for field angle of correction of 0.5°) < 0.1 mm | 0.095 |
| (3) | \|β3t · (1 − β2t)\| > 1.9 | 2.13 |
| (4) | v3 − v4 ≥ 15 | 20.1 |
| (5) | d/fw ≤ 0.25 | 0.027 |

FIGS. 14A–14D show the spherical aberration, astigmatism, distortion, and lateral color, respectively, of the zoom lens of Embodiment 4 at the wide-angle end, and FIGS. 15A–15D show the spherical aberration, astigmatism, distortion, and lateral color, respectively, of the zoom lens of Embodiment 4 at the telephoto end. These are aberrations obtained when the second lens group G2 for preventing a blurred image is at its normal position and under no influence of movement of the zoom lens, such as movement or vibration due to shaky hands holding the zoom lens. In FIGS. 14A and 15A, the spherical aberration (in mm) is shown for the wavelengths 587.6 nm (the d-line and indicated by a solid line), 460 nm (indicated by a dashed line), and 615 nm (indicated by a double dashed line), and the f-number (FNO.) is shown. In the remaining figures, ω is the half-field angle. In FIGS. 14B and 15B, the astigmatism (in mm) is shown for both the sagittal image surface S and the tangential image surface T and is measured at 587.6 nm (the d-line). In FIGS. 14C and 15C, distortion (in per cent) is measured at 587.6 nm (the d-line). In FIGS. 14D and 15D, the lateral color (in μm) is shown for the wavelengths 460 nm and 615 nm relative to 587.6 nm (the d-line).

Figure 16:
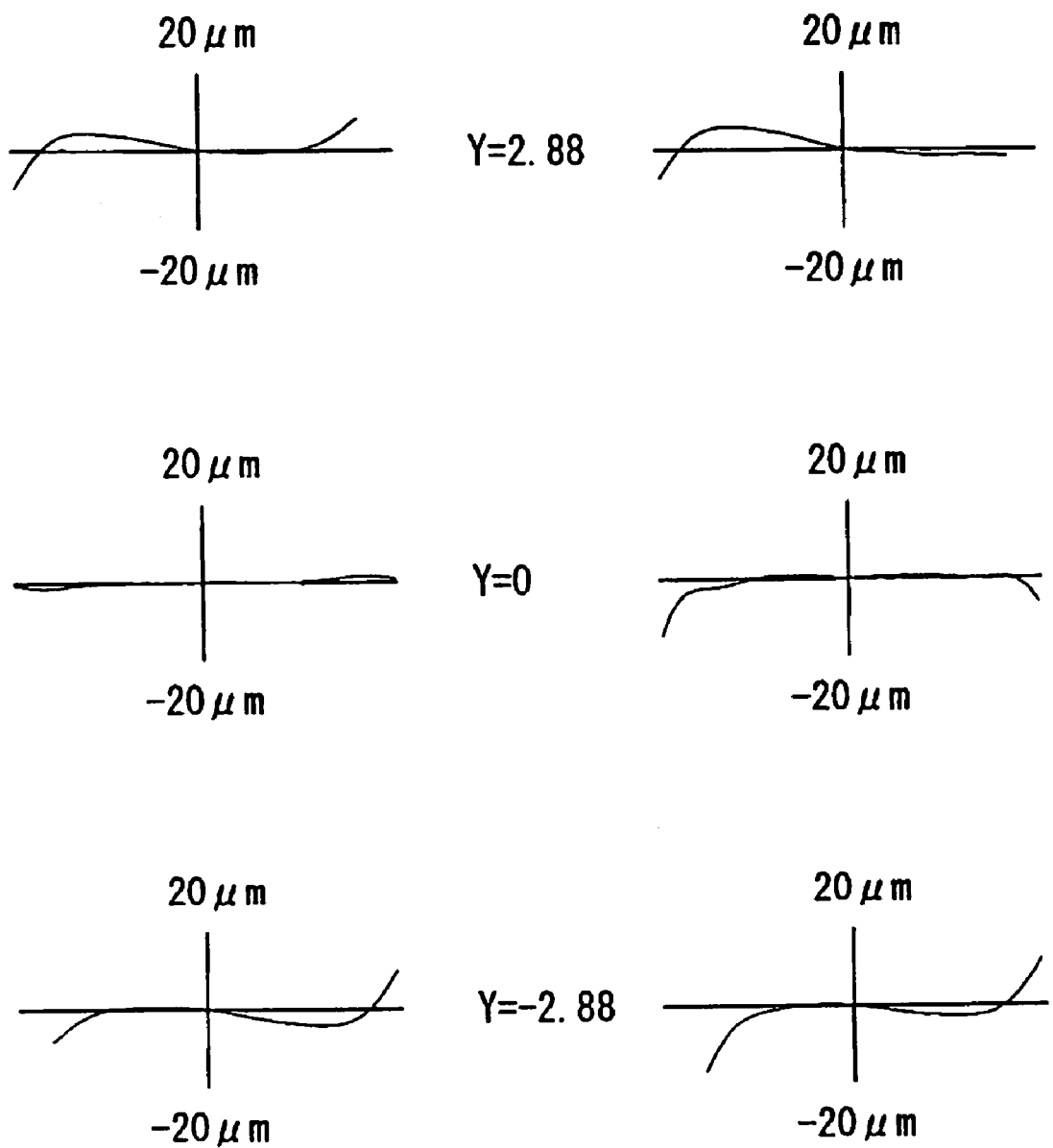
FIG. 16 shows the coma aberrations of the zoom lens of Embodiment 4 of the present invention at the telephoto end under normal conditions and under conditions of preventing blurring.

FIG. 16 shows coma aberrations (in μm) of the zoom lens of Embodiment 4 of the present invention at the telephoto end under normal conditions on the left side of FIG. 16, and under conditions of preventing blurring on the right side of FIG. 16. Specifically, the right side of FIG. 16 shows coma aberrations during corrective movement of the second lens group G2 in order to prevent a blurred image with a field angle of correction of 0.5 degrees at the telephoto end. Each graph of FIG. 16 shows coma aberrations at a wavelength of 587.6 nm (the d-line), with Y denoting the distance from the optical axis to the image point, that is, the image height (in mm).

As is evident from FIG. 16, the changes in aberrations during the correction for preventing blurring of an image are very small in Embodiment 4.

Additionally, as seen from the numerical data above and the figures discussed above, Embodiment 4 provides a high performance zoom lens that can maintain excellent optical performance during the correction for preventing blurring of an image while providing a compact zoom lens.

The present invention is not limited to the aforementioned embodiments, as it will be immediately apparent that various alternative implementations are possible. For instance, values such as the radius of curvature R of each of the lens components and lens elements, the shapes of the aspheric lens surfaces, the surface spacings D, the refractive index $N_d$, and Abbe number $\nu_d$ of the lens elements are not limited to those indicated in each of the aforementioned embodiments, as other values can be adopted. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens including a function of preventing blurring of an image comprising, arranged along an optical axis in order from the object side as follows:
   a first lens group having negative refractive power;
   a second lens group having positive refractive power; and
   a third lens group having positive refractive power;
   wherein
   said first lens group includes, arranged along the optical axis in order from the object side, a lens element having negative refractive power and a lens element having positive refractive power;
   said first lens group includes at least one aspheric lens surface;
   said second lens group includes, arranged along the optical axis in order from the object side, a lens element having positive refractive power and a lens element having negative refractive power that are joined together to form a doublet, and a lens element having a meniscus shape, and including at least one aspheric lens surface;
   the distance along the optical axis between said first lens group and said second lens group changes during zooming between the wide-angle end and the telephoto end;
   the distance along the optical axis between said second lens group and said third lens group changes during zooming between the wide-angle end and the telephoto end;
   said third lens group moves along the optical axis toward the object side during focusing of the zoom lens from infinity to close range;
   said second lens group moves orthogonally to the optical axis in order to correct for blurring of an image at an image plane on the image side of the zoom lens due to movements of the zoom lens; and
   the following condition is satisfied:

$$\beta 2t < -1.5$$

where
   $\beta 2t$ is the image magnification of said second lens group at the telephoto end.

2. The zoom lens of claim 1, wherein the following condition is satisfied:

$$0.05 \text{ mm} < (ft \cdot \tan \Delta\theta)/|3t(1-\beta 2t)| < 0.1 \text{ mm}$$

where
   ft is the focal length of the zoom lens at the telephoto end;
   Δθ is the field angle of correction at the telephoto end; and
   β3t is the image magnification of said third lens group at the telephoto end.

3. The zoom lens of claim 2, wherein the following condition is satisfied:

$$|\beta 3t(1-\beta 2t)| > 1.9.$$

4. The zoom lens of claim 3, wherein:
   the following equation is satisfied for at least one aspheric lens surface of said first lens group:

$$Z=[(C \cdot Y^2)/\{1+(1-K \cdot C^2 \cdot Y^2)^{1/2}\}]+\Sigma(A_i \cdot Y^i)$$

where
   Z is the length of a line drawn from a point on said at least one aspheric lens surface of said first lens group at a distance Y from the optical axis to the tangential plane of the aspheric lens surface vertex,
   C is the curvature (=1/the radius of curvature, R) of said at least one aspheric lens surface of said first lens group on the optical axis,
   Y is the distance from the optical axis,
   K is the eccentricity, and
   $A_i$ is the ith aspheric coefficient, and the summation extends over i, where i is equal to or greater than three; and
   at least one aspheric coefficient of even order and at least one aspheric coefficient of odd order are non-zero, or at least one aspheric coefficient of sixteenth order or higher is non-zero, for said at least one aspheric lens surface of said first lens group.

5. The zoom lens of claim 2, wherein the following conditions are satisfied:

$$\nu 3-\nu 4 \geq 15$$

$$d/fw \leq 0.25$$

where
   ν3 is the Abbe number at the d-line of the lens element having positive refractive power of said doublet;
   ν4 is the Abbe number at the d-line of the lens element having negative refractive power of said doublet;
   d is the distance along the optical axis between said lens element having negative refractive power of said second lens group and said lens element having a meniscus shape of said second lens group; and
   fw is the focal length of the zoom lens at the wide-angle end.

6. The zoom lens of claim 5, wherein:

the following equation is satisfied for at least one aspheric lens surface of said first lens group:

$$Z=[(C \cdot Y^2)/\{1+(1-K \cdot C^2 \cdot Y^2)^{1/2}\}]+\Sigma(A_i \cdot Y^i)$$

where

Z is the length of a line drawn from a point on said at least one aspheric lens surface of said first lens group at a distance Y from the optical axis to the tangential plane of the aspheric lens surface vertex, C is the curvature (=1/the radius of curvature, R) of said at least one aspheric lens surface of said first lens group on the optical axis, Y is the distance from the optical axis, K is the eccentricity, and $A_i$ is the ith aspheric coefficient, and the summation extends over i, where i is equal to or greater than three; and at least one aspheric coefficient of even order and at least one aspheric coefficient of odd order are non-zero, or at least one aspheric coefficient of sixteenth order or higher is non-zero, for said at least one aspheric lens surface of said first lens group.

7. The zoom lens of claim 2, wherein said lens element having a meniscus shape of said second lens group is aspheric on both sides.

8. The zoom lens of claim 2, wherein:

the following equation is satisfied for at least one aspheric lens surface of said first lens group:

$$Z=[(C \cdot Y^2)/\{1+(1-K \cdot C^2 \cdot Y^2)^{1/2}\}]+\Sigma(A_i \cdot Y^i)$$

where

Z is the length of a line drawn from a point on said at least one aspheric lens surface of said first lens group at a distance Y from the optical axis to the tangential plane of the aspheric lens surface vertex, C is the curvature (=1/the radius of curvature, R) of said at least one aspheric lens surface of said first lens group on the optical axis, Y is the distance from the optical axis, K is the eccentricity, and $A_i$ is the ith aspheric coefficient, and the summation extends over i, where i is equal to or greater than three; and at least one aspheric coefficient of even order and at least one aspheric coefficient of odd order are non-zero, or at least one aspheric coefficient of sixteenth order or higher is non-zero, for said at least one aspheric lens surface of said first lens group.

9. The zoom lens of claim 2, wherein during zooming from the wide-angle end to the telephoto end:

the distance along the optical axis between said first lens group and said second lens decreases;

said second lens group moves along the optical axis continuously toward the object side;

said third lens group moves along said optical axis first away from the image side and then toward the image side;

said third lens group is closer to the image side at the telephoto end than at the wide-angle end when the zoom lens remains focused at infinity; and as said second lens group moves along said optical axis continuously toward the object side at a constant speed, said third lens group moves more quickly along the optical axis as zooming approaches the wide-angle end and as zooming approaches the telephoto end than in the middle range of zooming between the wide-angle end and the telephoto end.

10. The zoom lens of claim 1, wherein the following condition is satisfied:

$$|\beta 3t(1-\beta 2t)|>1.9$$

where $\beta 3t$ is the image magnification of said third lens group at the telephoto end.

11. The zoom lens of claim 10, wherein the following conditions are satisfied:

$$\nu 3-\nu 4 \geqq 15$$

$$d/fw \leqq 0.25$$

where $\nu 3$ is the Abbe number at the d-line of the lens element having positive refractive power of said doublet;

$\nu 4$ is the Abbe number at the d-line of the lens element having negative refractive power of said doublet;

d is the distance along the optical axis between said lens element having negative refractive power of said second lens group and said lens element having a meniscus shape of said second lens group; and fw is the focal length of the zoom lens at the wide-angle end.

12. The zoom lens of claim 10, wherein said lens element having a meniscus shape of said second lens group is aspheric on both sides.

13. The zoom lens of claim 10, wherein:

the following equation is satisfied for at least one aspheric lens surface of said first lens group:

$$Z=[(C \cdot Y^2)/\{1+(1-K \cdot C^2 \cdot Y^2)^{1/2}\}]+\Sigma(A_i \cdot Y^i)$$

where

Z is the length of a line drawn from a point on said at least one aspheric lens surface of said first lens group at a distance Y from the optical axis to the tangential plane of the aspheric lens surface vertex, C is the curvature (=1/the radius of curvature, R) of said at least one aspheric lens surface of said first lens group on the optical axis, Y is the distance from the optical axis, K is the eccentricity, and $A_i$ is the ith aspheric coefficient, and the summation extends over i, where i is equal to or greater than three; and at least one aspheric coefficient of even order and at least one aspheric coefficient of odd order are non-zero, or at least one aspheric coefficient of sixteenth order or higher is non-zero, for said at least one aspheric lens surface of said first lens group.

14. The zoom lens of claim 10, wherein during zooming from the wide-angle end to the telephoto end:

the distance along the optical axis between said first lens group and said second lens decreases;

said second lens group moves along the optical axis continuously toward the object side;

said third lens group moves along said optical axis first away from the image side and then toward the image side;

said third lens group is closer to the image side at the telephoto end than at the wide-angle end when the zoom lens remains focused at infinity; and as said second lens group moves along said optical axis continuously toward the object side at a constant speed, said third lens group moves more quickly along the optical axis as zooming approaches the wide-angle end and as zooming approaches the telephoto end than in the middle range of zooming between the wide-angle end and the telephoto end.

15. The zoom lens of claim 1, wherein the following conditions are satisfied:

$$v3-v4 \geq 15$$

$$d/fw \leq 0.25$$

where v3 is the Abbe number at the d-line of the lens element having positive refractive power of said doublet;

v4 is the Abbe number at the d-line of the lens element having negative refractive power of said doublet;

d is the distance along the optical axis between said lens element having negative refractive power of said second lens group and said lens element having a meniscus shape of said second lens group; and fw is the focal length of the zoom lens at the wide-angle end.

16. The zoom lens of claim 15, wherein during zooming from the wide-angle end to the telephoto end:

the distance along the optical axis between said first lens group and said second lens decreases;

said second lens group moves along the optical axis continuously toward the object side;

said third lens group moves along said optical axis first away from the image side and then toward the image side;

said third lens group is closer to the image side at the telephoto end than at the wide-angle end when the zoom lens remains focused at infinity; and as said second lens group moves along said optical axis continuously toward the object side at a constant speed, said third lens group moves more quickly along the optical axis as zooming approaches the wide-angle end and as zooming approaches the telephoto end than in the middle range of zooming between the wide-angle end and the telephoto end.

17. The zoom lens of claim 1, wherein said lens element having a meniscus shape of said second lens group is aspheric on both sides.

18. The zoom lens of claim 17, wherein during zooming from the wide-angle end to the telephoto end:

the distance along the optical axis between said first lens group and said second lens decreases;

said second lens group moves along the optical axis continuously toward the object side;

said third lens group moves along said optical axis first away from the image side and then toward the image side;

said third lens group is closer to the image side at the telephoto end than at the wide-angle end when the zoom lens remains focused at infinity; and as said second lens group moves along said optical axis continuously toward the object side at a constant speed, said third lens group moves more quickly along the optical axis as zooming approaches the wide-angle end and as zooming approaches the telephoto end than in the middle range of zooming between the wide-angle end and the telephoto end.

19. The zoom lens of claim 1, wherein:

the following equation is satisfied for at least one aspheric lens surface of said first lens group:

$$Z=[(C \cdot Y^2)/\{1+(1-K \cdot C^2 \cdot Y^2)^{1/2}\}]+\Sigma(A_i \cdot Y^i)$$

where

Z is the length of a line drawn from a point on said at least one aspheric lens surface of said first lens group at a distance Y from the optical axis to the tangential plane of the aspheric lens surface vertex, C is the curvature (=1/the radius of curvature, R) of said at least one aspheric lens surface of said first lens group on the optical axis, Y is the distance from the optical axis, K is the eccentricity, and $A_i$ is the ith aspheric coefficient, and the summation extends over i, where i is equal to or greater than three; and at least one aspheric coefficient of even order and at least one aspheric coefficient of odd order are non-zero, or at least one aspheric coefficient of sixteenth order or higher is non-zero, for said at least one aspheric lens surface of said first lens group.

20. The zoom lens of claim 1, wherein during zooming from the wide-angle end to the telephoto end:

the distance along the optical axis between said first lens group and said second lens decreases;

said second lens group moves along the optical axis continuously toward the object side;

said third lens group moves along said optical axis first away from the image side and then toward the image side;

said third lens group is closer to the image side at the telephoto end than at the wide-angle end when the zoom lens remains focused at infinity; and as said second lens group moves along said optical axis continuously toward the object side at a constant speed, said third lens group moves more quickly along the optical axis as zooming approaches the wide-angle end and as zooming approaches the telephoto end than in the middle range of zooming between the wide-angle end and the telephoto end.

* * * * *

UNITED STATES PATENT AND TRADEMARK OFFICE
CERTIFICATE OF CORRECTION

| | | |
|---|---|---|
| PATENT NO. | : 7,215,487 B2 | Page 1 of 1 |
| APPLICATION NO. | : 11/365852 | |
| DATED | : May 8, 2007 | |
| INVENTOR(S) | : Ori | |

It is certified that error appears in the above-identified patent and that said Letters Patent is hereby corrected as shown below:

Col. 7, line 39
Change "S corresponding" to -- corresponding -- ; and

Col. 20, line 16 claim 2
Change the equation to: -- $0.05 \text{ mm} < (ft \cdot \tan \Delta\theta) / | \beta 3t \cdot (1 - \beta 2t) | < 0.1 \text{ mm}$ --.

Signed and Sealed this

Thirty-first Day of July, 2007

JON W. DUDAS
*Director of the United States Patent and Trademark Office*